(12) United States Patent
You

(10) Patent No.: US 12,632,133 B2
(45) Date of Patent: May 19, 2026

(54) DISPLAY DEVICE

(71) Applicant: SAMSUNG DISPLAY CO., LTD.,
Yongin-si (KR)

(72) Inventor: Chun Gi You, Asan-si (KR)

( * ) Notice: Subject to any disclaimer, the term of this
patent is extended or adjusted under 35
U.S.C. 154(b) by 818 days.

(21) Appl. No.: 17/806,518

(22) Filed: Jun. 13, 2022

(65) Prior Publication Data

US 2023/0148163 A1      May 11, 2023

(30) Foreign Application Priority Data

Nov. 9, 2021      (KR) ........................ 10-2021-0152922

(51) Int. Cl.
*G06F 3/041*      (2006.01)
*G02B 1/00*      (2006.01)
*G02B 5/08*      (2006.01)
*G02B 5/30*      (2006.01)

(52) U.S. Cl.
CPC ........... *G06F 3/0412* (2013.01); *G02B 1/002*
(2013.01); *G02B 5/0808* (2013.01); *G02B*
*5/3033* (2013.01)

(58) Field of Classification Search
CPC .... G02B 3/0412; G02B 1/002; G02B 5/0808;
G02B 5/3033; G06F 3/0412
USPC ........................................................ 359/483
See application file for complete search history.

(56) References Cited

U.S. PATENT DOCUMENTS

| | | | |
|---|---|---|---|
| 8,603,611 B2 | 12/2013 | Wakabayashi et al. | |
| 2010/0108409 A1* | 5/2010 | Tanaka ................... | G06F 3/0412 |
| | | | 345/174 |

| | | | |
|---|---|---|---|
| 2013/0343032 A1 | 12/2013 | Lee et al. | |
| 2016/0117031 A1* | 4/2016 | Han ...................... | G06F 3/0412 |
| | | | 345/174 |
| 2018/0018044 A1* | 1/2018 | Hong .................... | G06F 3/0443 |
| 2020/0124886 A1* | 4/2020 | Song .................... | G02B 6/0068 |
| 2020/0301201 A1* | 9/2020 | Cho ..................... | G02F 1/13452 |
| 2021/0191576 A1* | 6/2021 | Kwon ................... | G06F 3/0448 |

FOREIGN PATENT DOCUMENTS

| | | |
|---|---|---|
| KR | 10-0704332 | 4/2007 |
| KR | 10-2008-0010384 A | 1/2008 |
| KR | 10-2011-0016345 A | 2/2011 |
| KR | 10-2011-0020049 A | 3/2011 |
| KR | 10-2013-0142715 A | 12/2013 |
| KR | 10-2018-0047609 A | 5/2018 |
| KR | 10-2023945 | 11/2019 |

OTHER PUBLICATIONS

Office Action dated Feb. 24, 2025 in related Korean Patent Application No. 10-2021-0152922, 8 pages (in Korean).

* cited by examiner

*Primary Examiner* — Balram T Parbadia
*Assistant Examiner* — Grant A Gagnon
(74) *Attorney, Agent, or Firm* — F. CHAU &
ASSOCIATES, LLC

(57)      ABSTRACT

A display device includes a first substrate, a second substrate
disposed to face the first substrate, a display with a light-
emitting element and disposed between the first substrate
and the second substrate, a polarizing member disposed over
the second substrate, and a cushion layer disposed between
the second substrate and the polarizing member. The cushion
layer includes an optically transparent adhesive or optically
transparent resin. The polarizing member includes an adhe-
sive layer coupled to the cushion layer. The cushion layer
and the adhesive layer are made of different materials.

20 Claims, 20 Drawing Sheets

ITO 50nm Vs ITO 80nm REFLECTANCE

ITO 50nm Vs ITO 80nm TRANSMITTANCE

C

400

630

610

200

DR3

DR1

DR2

DISPLAY DEVICE

This application claims priority from Korean Patent Application No. 10-2021-0152922 filed on Nov. 9, 2021 in the Korean Intellectual Property Office, the disclosure of which is incorporated herein by reference in its entirety.

BACKGROUND

1. Field of the Disclosure

The present disclosure relates to a display device.

2. Description of the Related Art

Display devices become increasingly important as multimedia technology evolves. Accordingly, a variety of display devices such as liquid-crystal display devices (LCDs) and organic light-emitting diode display devices (OLEDs) are currently being developed.

Among display devices, an organic light-emitting display device includes organic light-emitting elements which are self-luminous elements. An organic light-emitting element may include two opposite electrodes and an organic emissive layer interposed therebetween. Electrons and holes supplied from the two electrodes are recombined in the emissive layer to generate excitons, and the generated excitons transit from the excited state to the ground state and generate light.

Some display devices may include two opposing substrates, and may further include a polarizing member for controlling visibility of external light on the upper substrate.

SUMMARY

Aspects of the present disclosure provide a display device that can prevent defects that external light is recognized by way of introducing a simple structure that can prevent warpage of the panel by pressure.

It should be noted that objects of the present disclosure are not limited to the above-mentioned object; and other objects of the present disclosure will be apparent to those skilled in the art from the following descriptions.

According to an embodiment of the disclosure, a display device comprises a first substrate; a second substrate disposed to face the first substrate; a display comprising a light-emitting element, the display being disposed between the first substrate and the second substrate; a polarizing member disposed above the second substrate; and a cushion layer disposed between the second substrate and the polarizing member. The cushion layer comprises an optically transparent adhesive or optically transparent resin. The polarizing member comprises an adhesive layer coupled to the cushion layer. The cushion layer and the adhesive layer are made of different materials.

The cushion layer may have a thickness between 50 μm and 200 μm.

The display device may further comprise a reflectance control layer disposed between the display and the cushion layer, wherein the reflectance control layer comprises a plurality of transparent conductive oxide film patterns. The transparent conductive oxide film patterns are separated from one another and are electrically floating.

The cushion layer may have an elastic modulus greater than an elastic modulus of the adhesive layer.

The cushion layer and the polarizing member may have a same width.

The display device may comprise a display area and a non-display area. The cushion layer entirely covers the display area.

The cushion layer may have a modulus between 0.17 Mpa and 0.25 Mpa.

According to an embodiment of the disclosure, a display device comprises a first substrate; a second substrate disposed to face the first substrate; a display comprising a light-emitting element, the display being disposed between the first substrate and the second substrate; a polarizing member disposed above the second substrate; and a cushion layer disposed between the second substrate and the polarizing member. The cushion layer is adhesive and comprises an optically transparent adhesive or optically transparent resin. The polarizing member is formed of multiple layers stacked on each other and includes a retardation layer as a lowermost layer of the multiple layers. The retardation layer is disposed directly on the cushion layer. The polarizing member has reflectance which changes depending on a wavelength of a light incident on the polarizing member.

The display device may further comprise a reflectance control layer disposed between the display and the cushion layer. The reflectance control layer comprises a plurality of transparent conductive oxide film patterns. The transparent conductive oxide film patterns are separated from one another and are floating.

According to an embodiment of the disclosure, a display device comprises a first substrate; a second substrate disposed to face the first substrate; a display disposed between the first substrate and the second substrate; a polarizing member disposed above the second substrate; and a reflectance control layer disposed between the display and the polarizing member. The reflectance control layer comprises a plurality of transparent conductive oxide film patterns. The transparent conductive oxide film patterns are separated from one another and are electrically floating.

The reflectance control layer may be disposed between the polarizing member and the second substrate.

The display device may further comprise a sensor electrode layer disposed between the second substrate and the reflectance control layer.

The sensor electrode layer may comprise sensor patterns. Each of the sensor patterns overlaps a corresponding one of the plurality of transparent conductive oxide film patterns.

A sum of a thickness of the sensor patterns and a thickness of the transparent conductive oxide film patterns may have a value between 60 nm and 100 nm.

The plurality of transparent conductive oxide film patterns may comprise ITO.

A thickness of the plurality of transparent conductive oxide film patterns may have a value between 60 nm and 100 nm.

The reflectance control layer may further comprise a transparent auxiliary layer disposed on the plurality of transparent conductive oxide film patterns.

The transparent auxiliary layer may comprise a silicon oxide film.

Each of the plurality of transparent conductive oxide film patterns may have a diamond shape. The transparent conductive oxide film patterns are arranged in a matrix.

A distance between adjacent ones of the transparent conductive oxide film patterns may be equal to or greater than 5 nm.

According to the embodiments of the present disclosure, a cushion layer absorbs external pressure, so that it is possible to prevent warpage of the display panel by an external pressure. Accordingly, even after pressure is applied, light incident from the outside and reflected off the panel is blocked by a polarizing member, so that the visibility of the display device can be improved.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

Hereinafter, embodiments of the present disclosure will be described with reference to the accompanying drawings.

Figure 1:
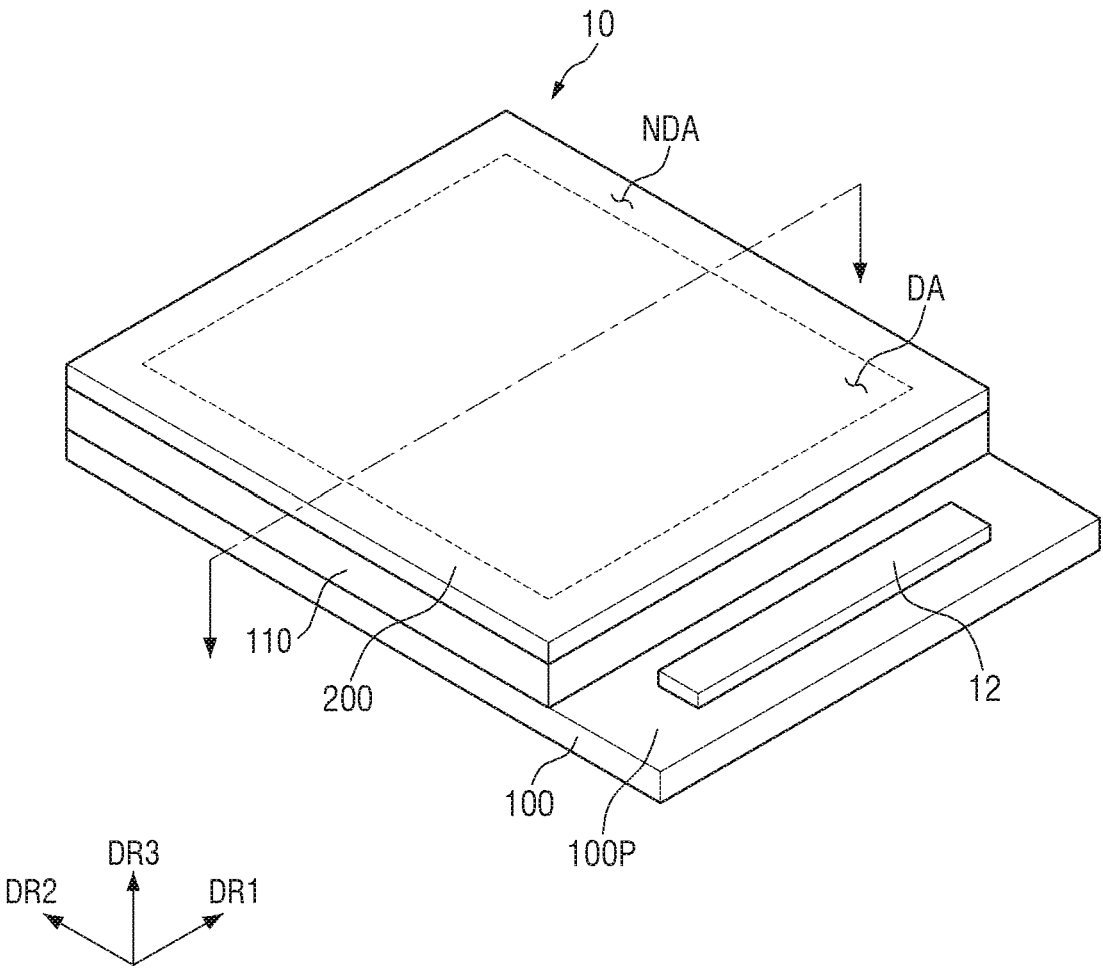
FIG. 1 is a perspective view of a display device according to an embodiment of the present disclosure.
Figure 2:
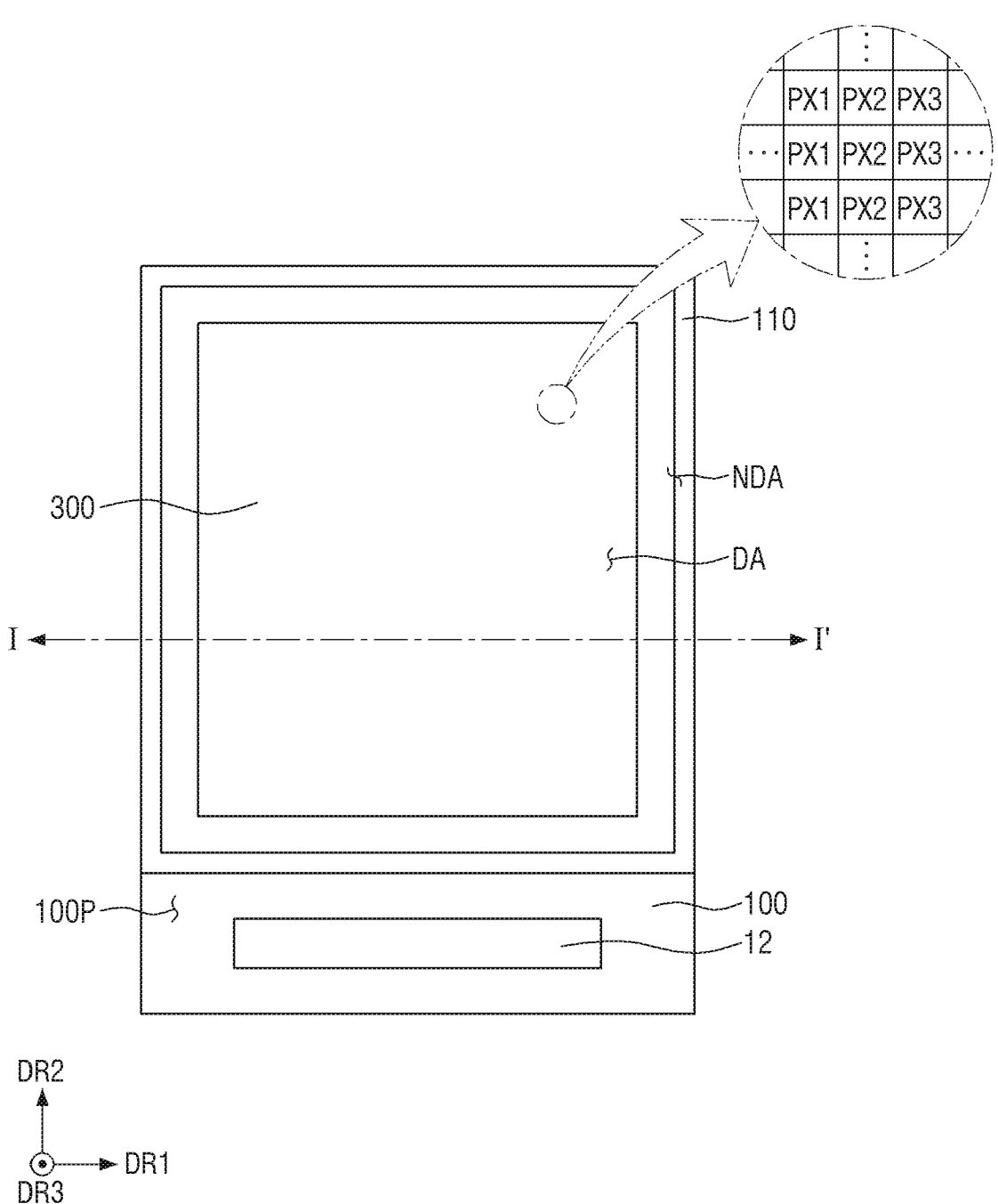
FIG. 2 is a plan view of a display device according to an embodiment of the present disclosure.
Figure 3:
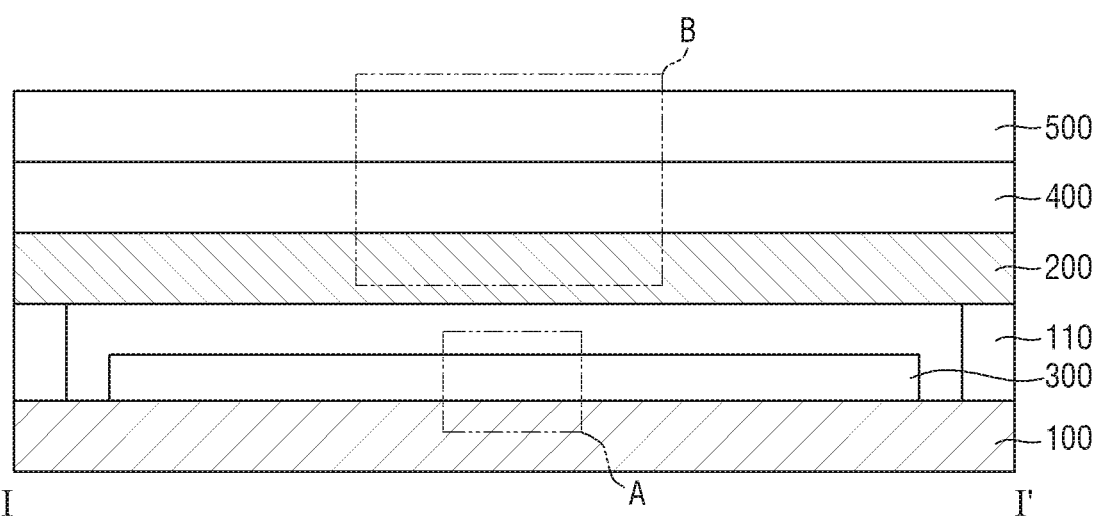
FIG. 3 is a cross-sectional view taken along line I-I' of FIG. 2.
Figure 3:
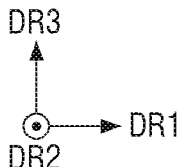

FIG. 1 is a perspective view of a display device according to an embodiment of the present disclosure. FIG. 2 is a plan view of a display device according to an embodiment of the present disclosure. FIG. 3 is a cross-sectional view taken along line I-I' of FIG. 2.

A display device 10 shown in FIGS. 1 to 3 may be employed in a variety of electronic devices including small-and-medium sized electronic devices such as a tablet PC, a smartphone, a vehicle navigation unit, a camera, a center information display (CID) installed in vehicles, a wrist-type electronic device, a personal digital assistant (PMP), a portable multimedia player (PMP) and a game machine, and medium-and-large electronic devices such as a television, an electric billboard, a monitor, a personal computer and a laptop computer.

The display device 10 may have a rectangular shape when viewed from the top. The display device 10 may have two shorter sides extended in a direction, and two longer sides extended in another direction crossing the direction. Although the corners where the longer sides and the shorter sides of the display device 10 meet may form a right angle when viewed from the top, this is merely illustrative. The display device 1 may have rounded corners. The shape of the display device 10 when viewed from the top is not limited to that shown in the drawings. The display device 70 may have a square shape, a circular shape, an elliptical shape or other shapes.

As used herein, a first direction DR1 may be parallel to the shorter sides of the display device 10, for example, the horizontal direction of the display device 10. A second direction DR2 may be parallel to the longer sides of the display device 10, for example, the vertical direction of the display device 10 when viewed from the top. A third direction DR3 may refer to the thickness direction of the display device 10.

The display device 10 may include a display area DA where images are displayed, and a non-display area NDA where no image is displayed.

The display area DA may be disposed in the center portion of display device 10. The display area DA may include a plurality of pixels PX. The plurality of pixels PX may include first pixels PX1 emitting light of a first color (e.g., red light having a peak wavelength in the range of approximately 610 to 650 nm or a peak wavelength between 610 nm and 650 nm), second pixels PX2 emitting light of a second color (e.g., green light having a peak wavelength in the range of approximately 510 to 550 nm or a peak wavelength between 510 nm and 550 nm), and third pixels PX3 emitting light of a third color (e.g., blue light having a peak wavelength in the range of approximately 430 to 470 nm or a peak wavelength between 430 nm and 470 nm). The first pixels PX1, the second pixels PX2 and the third pixels PX3 may be arranged repeatedly in a row direction and in a column direction. The pixels PX1, PX2 and PX3 may be arranged in a variety of ways such as stripes and PenTile pattern In addition, each of the pixels may include at least one light-emitting element that emits light of a particular wavelength range to represent a color.

The non-display area NDA may be disposed on the outer side of the display area DA. Although the display area DA is formed in a rectangular shape and the non-display area NDA surrounds all of the edges of the display area DA in the drawings, the present disclosure is not limited thereto. The non-display area NDA may be eliminated from one or more edges of the display area DA.

The display device 10 may include a display panel 11 and a driver circuit 12.

The display panel 11 may include a first substrate 100, a second substrate 200 facing the first substrate 100, a display 300 disposed on the first substrate 100, and a sealing member 110 disposed between the first substrate 100 and the second substrate 200 along their outer positions (or edges).

The first substrate 100 supports the display 300. The first substrate 100 may be formed of a polymer material including glass or plastic. The first substrate 100 may be transparent, but the present disclosure is not limited thereto. According to an embodiment, a transparent glass substrate is employed as the first substrate 100.

The second substrate 200 is disposed to face the first substrate 100. The second substrate 200 may include or may be formed of, but is not limited to, transparent glass. For example, transparent plastic may be employed as the second substrate 200.

The first substrate 100 and the second substrate 200 are disposed parallel to each other.

The first substrate 100 generally overlaps with the second substrate 200 in the third direction DR3 and may protrude from the side surface of the second substrate 200 (a protrusion 100p protruding in the second direction DR2). The protrusion 110p adjacent to the fourth side of the first substrate 100 may not be covered by the second substrate 200 but may be exposed.

A driver may be disposed on the protrusion 110p of the first substrate 100. The driver may include a driver circuit 12 like a chip as shown in the drawings. Alternatively, the driver may include only driving lines without the driver circuit 12 in the form of a chip, and a driver circuit 12 may be mounted thereon or a separate film, printed circuit board or flexible printed circuit board connected thereto may be located at the end of the protrusion 100P.

The sealing member 110 may be disposed between the one surface of the first substrate 100 and the opposite surface of the second substrate 200 to surround the edges of the opposite surface of the second substrate 200. The sealing member 110 may attach the first substrate 100 to the second substrate 200, and may seal the space between the first substrate 100 and the second substrate 200.

Figure 4:
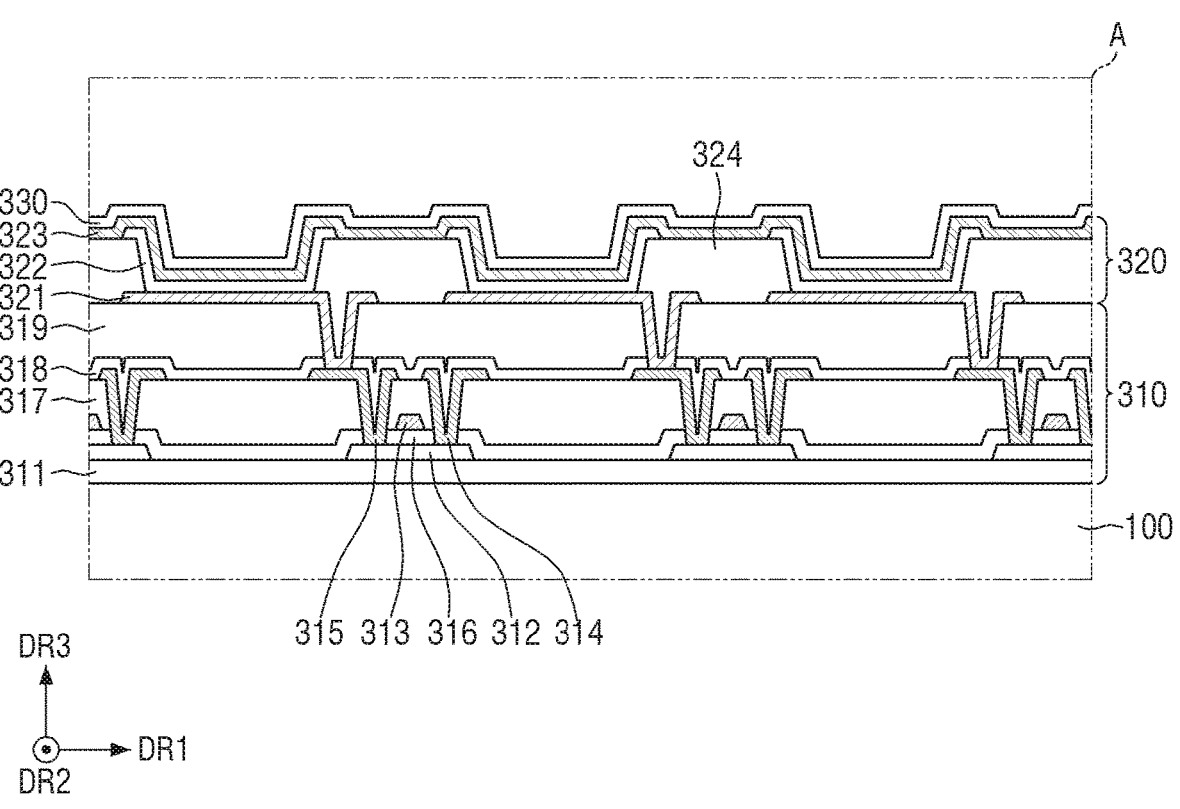
FIG. 4 is an enlarged view of area A of FIG. 3.

FIG. 4 is an enlarged view of area A of FIG. 3.

Referring to FIG. 4, the display 300 is disposed on the first surface of the first substrate 100 and displays an image. The display 300 may be one of: a top-emission display that provides image-related light toward the second substrate 200, a bottom-emission display that provides image-related light toward the rear side of the first substrate 100, and a dual-emission display that provides image-related light to both front and rear sides. In the following description, a top-emission display will be described as the display 300.

As shown in FIG. 4, the display 300 may include a thin-film transistor layer 310, a light-emitting element layer 320, and a capping film 330 sequentially disposed on the first substrate 100.

The thin-film transistor layer 310 may include a conductive film, an insulating film and a semiconductor layer 312 forming thin-film transistors, and an insulating film and/or a conductive film disposed above and below them.

Specifically, a buffer layer 311 may be disposed on the first substrate 100, and the semiconductor layer 312 may be disposed on the buffer layer 311.

A gate insulator 316 may be disposed on the semiconductor layer 312, and a first conductive layer including a gate electrode 313 that at least partially overlaps the semiconductor layer 312 may be disposed on the gate insulator 316.

An interlayer dielectric film 317 may be disposed on the first conductive layer, and a second conductive layer including a data line, a source electrode 314 and a drain electrode 315 may be disposed on the interlayer dielectric film 317. The source electrode 314 and the drain electrode 315 are electrically connected to the semiconductor layer 312 through a contact hole 733 penetrating the interlayer dielectric film 317 and the gate insulator 316. The semiconductor layer 312, the gate electrode 313, the source electrode 314 and the drain electrode 315 described above may form a thin-film transistor.

A passivation film 318 may be disposed on the second conductive layer, and a planarization film 319 may be disposed on the passivation film 318.

The light-emitting element layer 320 may be disposed on the thin-film transistor layer 310. The light-emitting element layer 320 may include light-emitting elements each including an anode electrode 321, an emission layer 322 and a cathode electrode 323, and a pixel-defining film 324.

Specifically, an anode electrode 321 may be disposed on the planarization film 319. The anode electrode 321 may be a pixel electrode. The anode electrode 321 may be connected to the source electrode 314 or the drain electrode 315 of the thin-film transistor layer 310 through the contact hole 733 penetrating the planarization film 319 and the passivation film 318.

The pixel-defining film 324 is disposed on the anode electrode 321. The pixel-defining film 324 includes an opening via which at least a part of the anode electrode 321 is exposed. The bank layer 324 may include or may be formed of an organic material or an inorganic material.

An emissive layer 322 may be disposed on the anode electrode 321 exposed by the pixel-defining film 324. According to an embodiment of the present disclosure, the emissive layer 322 may include an organic, emissive layer and may further include hole injection/transport layers and/or electron injection/transport layers as auxiliary layers to facilitate emission. It should be understood, however, that the present disclosure is not limited thereto. An inorganic emissive layer including an inorganic semiconductor may be included as the emissive layer 322.

The cathode electrode 323 may be disposed on the emissive layer 322. The cathode electrode 323 may be a common electrode.

The above-described anode electrode 321, the emissive layer 322 and the cathode electrode 323 may form a light-emitting diode.

The capping film 330 may be disposed on the cathode electrode 323. The capping film 330 may protect the underlying elements.

Referring back to FIG. 3 the second substrate 200 is disposed above the display 300. The display 300 may be spaced apart from the second substrate 200, and the space therebetween may be filled with an inert gas such as nitrogen gas. It is, however, to be understood that the present disclosure is not limited thereto. The space between the second substrate 200 and the display 300 may be filled with a filler made of a solid material, etc.

The display device 10 may further include a polarizing member 500 and a cushion layer 400 disposed on the display panel 11. Specifically, the cushion layer 400 may be disposed on one surface of the second substrate 200, and the polarizing member 500 may be disposed on one surface of the cushion layer 400. The polarizing member 500 and the cushion layer 400 may have the same shape and size when viewed from the top and may be disposed to overlap each other. The polarizing member 500 and the cushioning layer 400 may have the same size and the same shape as the second substrate 200 when viewed from the top. For example, as shown in FIG. 3, the side surfaces of the second substrate 200, the side surfaces of the cushion layer 400 and the side surfaces of the polarizing member 500 may be aligned with one another when viewed from the top. When the shape of one surface of the second substrate 200 forming the display device 10 is rectangular, the opposite surface of the cushion layer 400 may also have a rectangular shape conforming to the shape of the one surface of the second substrate 200. The cushion layer 400 may have a generally rectangular parallelepiped shape. It should be understood, however, that the present disclosure is not limited thereto. The polarizing member 500 and the cushion layer 400 may be smaller than the second substrate 200, and accordingly the side surfaces thereof may be located more to the inside than the side surfaces of the second substrate 200. Each of the polarizing member 500 and the cushion layer 400 may have a size enough to cover at least the display area DA. In an embodiment, the cushion layer 400 may entirely cover at least the display area.

The cushion layer 400 may be disposed directly on one surface of the second substrate 200. According to an embodiment of the present disclosure, the cushion layer 400 may include or may be formed of an adhesive material and may be attached directly to the surface of the second substrate 200. In addition, the polarizing member 500 may be disposed directly on the cushion layer 400, and may be attached directly to the surface of the cushion layer 400 because the cushion layer 400 may be adhesive. However, the arrangement relationship of the second substrate 200, the cushion layer 400 and the polarizing member 500 is not limited to that described above, but another layer or an adhesive member may be further disposed between the elements stacked on one another.

Figure 5:
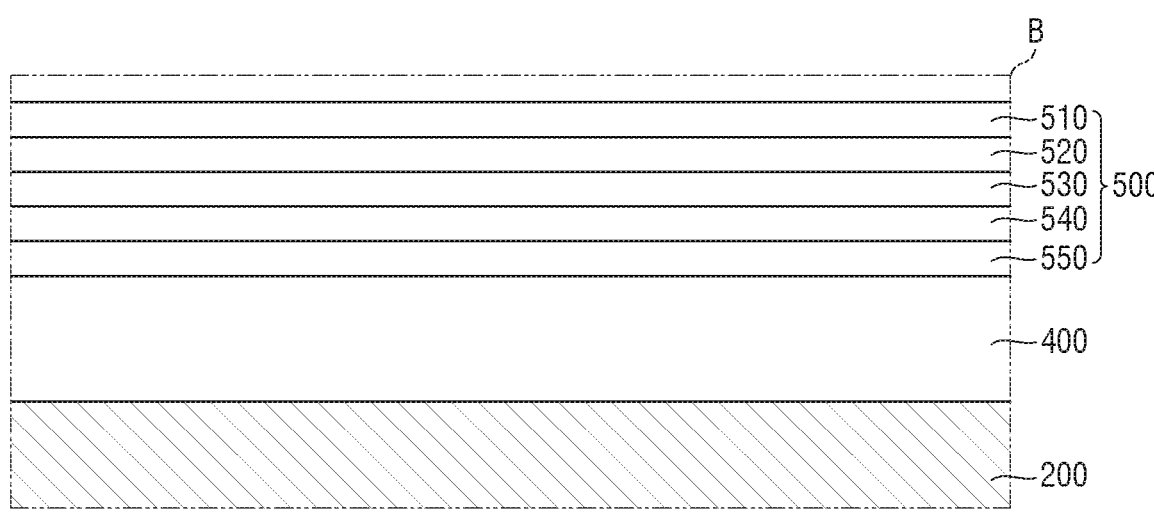
FIG. 5 is an enlarged view of area B of FIG. 3.
Figure 5:
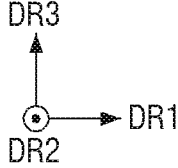

FIG. 5 is an enlarged view of area B of FIG. 3.

Referring to FIG. 5, the polarizing member 500 may include an adhesive layer 550, a retardation layer 540, a second protective layer 530, a polarization layer 520, and a first protective layer 510. In an embodiment, the polarizing member 500 may be formed of multiple layers staked on each other.

As shown in FIG. 5, an adhesive layer 550 may be disposed at the bottom of the polarizing member 500, a retardation layer 540 may be disposed on one surface of the adhesive layer 550, a second protective layer 530 may be disposed on one surface of the retardation layer 540, a polarization layer 520 may be disposed on one surface of the second protective layer 530, and a first protective layer 510 may be disposed on one surface of the polarization layer 520. For example, the polarizing member 500 may include the adhesive layer 550, the retardation layer 540, the second protective layer 530, the polarization layer 520 and the first protective layer 510 sequentially stacked on one another in the third direction DR3. In an embodiment, the adhesive layer 550 may be the lowermost layer among the multiple layers of the polarizing member 500, and the first protective layer 510 may be the uppermost layer among the multiple layers of the polarizing member 500. The adhesive layer 550 may contact the cushion layer 400.

The first protective layer 510 and the second protective layer 530 serve to protect the polarization layer 520. The first protective layer 510 may be disposed on one surface of the polarization layer 520, and the second protective layer 530 may be disposed on the opposite surface of the polarization layer 520. The polarization layer 520 is sandwiched between the first protective layer 510 and the second protective layer 530 so that it can be protected by them. The first protective layer 510 and the second protective layer 530 may be disposed directly on the surface and the opposite surface of the polarization layer 520, respectively, or may be disposed with adhesive layers therebetween.

The first protective layer 510 and the second protective layer 530 may be films including thermoplastic resins, e.g., a polyester resin such as polyethylene terephthalate, polyethylene isophthalate and polybutylene terephthalate; a cellulose resin such as triacetyl cellulose (TAC) and diacetyl cellulose; a polycarbonate-based resin; an acrylic resins such as polymethyl (meth) acrylate and polyethyl (meth) acrylate; a styrenic resin such as polystyrene and acrylonitrile-styrene copolymer; a polyolefin resin having a polyethylene, polypropylene, cyclo-based or norbornene structure; a polyolefin resin such as an ethylene propylene copolymer; a vinyl chloride resin; a polyamide resin such as nylon and aromatic polyamide; an imide resin; a polyethersulfone resin; a sulfone resin; a polyetherketone resin; a sulfide polyphenylene resin; a vinyl alcohol resin; a vinylidene chloride resin; a vinyl butyral resin; an allylate resin; a polyoxymethylene resin; epoxy resin, or films including a blend of the thermoplastic resins.

According to an embodiment of the present disclosure, each of the first protective layer 510 and the second protective layer 530 may have a relatively small thickness of approximately 20 μm or less, or may have a relatively large thickness of approximately 20 μm to 50 μm depending on the configuration of the display device 10 including the polarizing member 500.

The surface of the first protective layer 510 forming the top layer of the polarizing member 500 may be additionally treated. For example, the surface of the first protective layer 510 may be subjected to a low-reflection treatment, an anti-glare treatment, an anti-fingerprint treatment, and/or a hard coating treatment.

The polarization layer 520 may be a layer that polarizes incident light, and may be a linear polarization layer. The polarization layer 520 may have an absorption axis and a transmission axis perpendicular to each other, and may absorb polarization components parallel to the absorption axis while transmitting polarization components parallel to the transmission axis. Accordingly, the polarization layer 520 may linearly polarize the incident light in the same direction as its transmission axis to output it. The polarization layer 520 may exhibit polarization properties as iodine ion chains are aligned by oriented polyvinyl alcohol (PVA) chains. In an embodiment, the polarization layer 520 may exhibit polarization properties as dichroic dyes are aligned by the oriented polyvinyl alcohol chains. In an embodiment, the polarization layer 520 may exhibit polarization properties by a polyene-based material formed by a dehydration reaction of polyvinyl alcohol or a dehydrochlorination reaction of polyvinyl chloride.

The thickness of the polarization layer 520 may be, but is not limited to, 5 to 40 μm.

The retardation layer 540 is disposed on the opposite surface of the second protective layer 530. The retardation layer 540 is a layer that changes the phase of light. The retardation layer 540 may delay the phase of the light linearly polarized by the polarization layer 520 to change the polarization state (elliptically polarized light or circularly polarized light). The retardation layer 540 may include or may be formed of a quarter wave plate (QWP) having λ/4 plate characteristics. When the retardation layer 540 is implemented using a quarter wave plate, the quarter wave plate may include or may be a cyclo olefin polymer (COP) film, a tri-acetyl cellulose (TAC) film, a polycarbonate (PC) film, etc. The COP film, the TAC film and the PC film may be stretchable in the left-and-right and back-and-forth directions, or may be stretchable in oblique directions. The thickness of the COP film, the TAC film and the PC film may range from approximately 15 μm to 45 μm or may have a value between 15 μm and 45 μm. In addition, the quarter wave plate may be implemented as a layer coated with a liquid-crystal compound without using a separate film. In other words, the quarter wave plate may include or may be formed of a liquid-crystal compound. As such, when the quarter wave plate is implemented using the liquid-crystal compound, the quarter wave plate may have a thickness of approximately 2 μm.

The adhesive layer 550 may be disposed at the bottom of the polarizing member 500 to attach the retardation layer 540 to the cushion layer 400. Accordingly, the polarizing member 500 may be fixed on the surface of the cushion layer 400 by the adhesive layer 550. The adhesive layer 550 may be, but is not limited to, a pressure-sensitive adhesive (PSA). For example, the adhesive layer 550 may be formed of a typical adhesive such as acrylic-, silicone-, polyester-, polyurethane-, polyamide-, polyether-, fluorine-, or rubber-based adhesive. The thickness of the adhesive layer 550 may be, but is not limited to, 30 μm or less.

The cushion layer 400 serves to reduce the influence of the pressure applied to the display device 10 from the outside on the display panel 11. According to an embodiment of the present disclosure, the cushion layer 400 may include or may be formed of an optically clear adhesive (OCA) or an optically clear resin (OCR). The cushion layer 400 may include or may be formed of a photocurable resin such as acrylic or a (meth)acrylic compound. The photocurable resin may further include a photoinitiator that generates free radicals or ions by light stimulation such as ultraviolet rays. Examples of the photoinitiator may include alpha-hydroxyketone, mono-oxide, benzophenone, thioxanthone, ketosulfone, benzyl ketal, phenylglyoxylate, borate, titanocene, and oxime ester photoinitiators, etc. In an embodiment, the cushion layer 400 and the adhesive layer 550 of the polarizing member 500 may be made of different materials from each other. For example, the cushion layer 400 may include or may be formed of an optically transparent adhesive or optically transparent resin, and the polarizing member 500 may include an adhesive layer 550 which is different from the optically transparent adhesive or optically transparent resin of the cushion layer 400.

It is advantageous for the cushion layer 400 to have a sufficient thickness for elasticity/restoration/shock absorption. For example, the thickness of the cushion layer 400 may be greater than the thickness of the adhesive layer 550. By increasing the thickness of the cushion layer 400, it is possible to reduce the influence on the cushion layer 400 and the layers under the cushion layer 400 by an external pressure. For example, it may be assumed that a pressure is applied to the surface of the display device 10 while a user touches or rubs the display device 10 and thus the thickness of the display device 10 is compressed by 10 μm. It is assumed that thickness compression of the display device 10 is resulted only from the thickness of the cushion layer 400. The rate of change in thickness depending on the thickness of the cushion layer 400 may be determined under the assumption. When the thickness of the cushion layer 400 is 30 μm, the cushion layer 400 is compressed from 30 μm to 20 μm, and thus the rate of change in thickness of the cushion layer 400 is 33.33%. When the thickness of the cushion layer 400 is 60 μm, the cushion layer 400 is compressed from 60 μm to 50 μm, and thus the rate of change in thickness of the cushion layer 400 is 16.67%. As described above, by increasing the thickness of the cushion layer 400, it is possible to reduce the rate of change in the thickness of the cushion layer 400 versus the pressure. At the same pressure applied to the surface of the display device 10, when the rate of change in the thickness of the cushion layer 400 decreases, the pressure applied to the molecules of the cushion layer 400 may be reduced. Accordingly, the pressure transmitted to the panel disposed on the opposite surface of the cushion layer 400 may be reduced. Accordingly, in terms of shock mitigation, it is advantageous that the cushion layer 400 has a large thickness. When the cushion layer 400 is attached to another layer, bubbles may occur between the cushion layer 400 and the layer. If the thickness of the cushion layer 400 is increased, it is possible to suppress bubbles between the cushion layer 400 and the second substrate 200 and between the cushion layer 400 and the polarizing member 500.

If the cushion layer 400 is too thick, however, there may arise a problem of a phase delay of light, and the thickness of the display device 10 is increase and thus the weight of the display device 10 may increase. In an embodiment, the thickness of the cushion layer 400 may range from 50 μm to 200 μm or may have a value between 50 μm and 200 μm.

The cushion layer 400 may have a sufficient elastic modulus. For example, the cushion layer 400 may have a greater elastic modulus than the adhesive layer 550 thereon. In addition, the cushion layer 400 may have a greater elastic modulus than all of the layers forming the polarizing member 500. For example, the elastic modulus of the cushion layer 400 may be, but is not limited to, in the range of 0.17 Mpa to 0.25 Mpa or may have a value between 0.17 Mpa and 0.25 Mpa. As such, when the elastic modulus of the cushion layer 400 is large, the cushion layer 400 itself can absorb most of a pressure applied to the surface of the display device 10, and can be restored to the original shape of the cushion layer 400 as soon as the pressure is removed. That is to say, when a pressure is applied to the surface of the display device 10, the pressure is transmitted to the cushion layer 400, and the cushion layer 400 contracts by a certain thickness in response to the transmitted pressure. An elastic force is generated in the cushion layer 400 in the direction opposite to the contraction direction in proportion to the contraction distance. When the pressure is removed, the portion contracted by the elastic force returns to its original shape. The elastic force of the cushion layer 400 in the third direction DR3 may be proportional to the elastic modulus of the cushion layer 400 and the amount of change in the thickness of the cushion layer 400.

As the cushion layer 400 can restore quickly, the paths of reflected external light can work as designed or the cushion layer 400 can minimize distortion of the paths of reflected light. More detailed description thereof will be given with reference to FIGS. 6 and 7.

Figure 6:
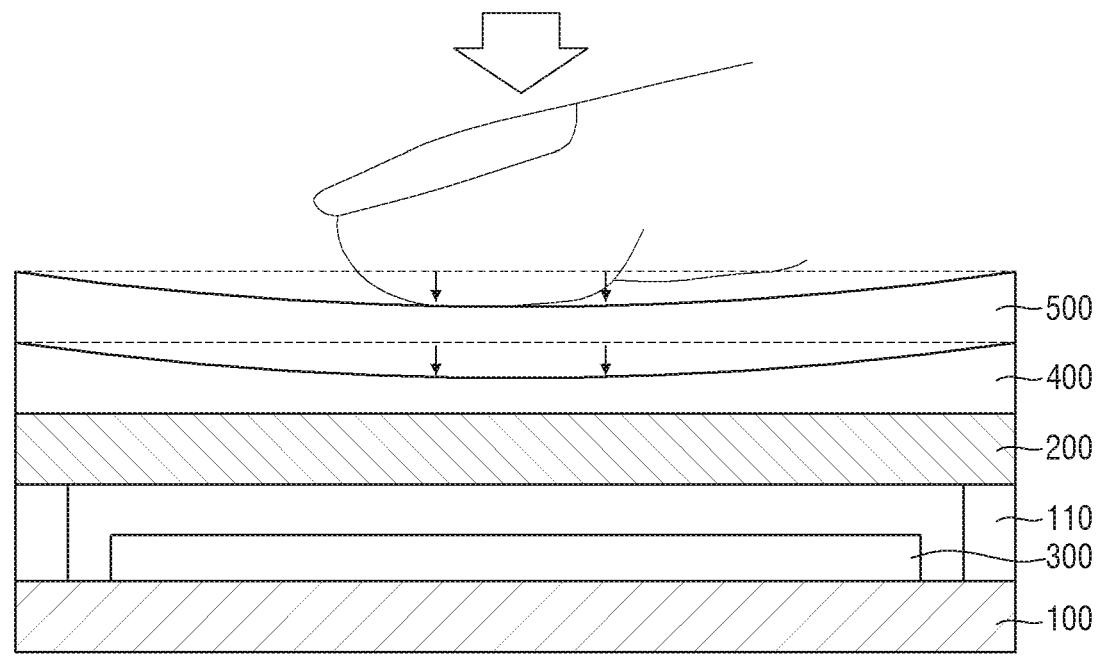
FIGS. 6 and 7 are cross-sectional views showing a change in the shape of a display device by an external pressure.
Figure 6:
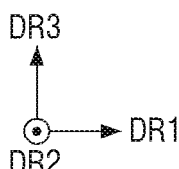
Figure 7:
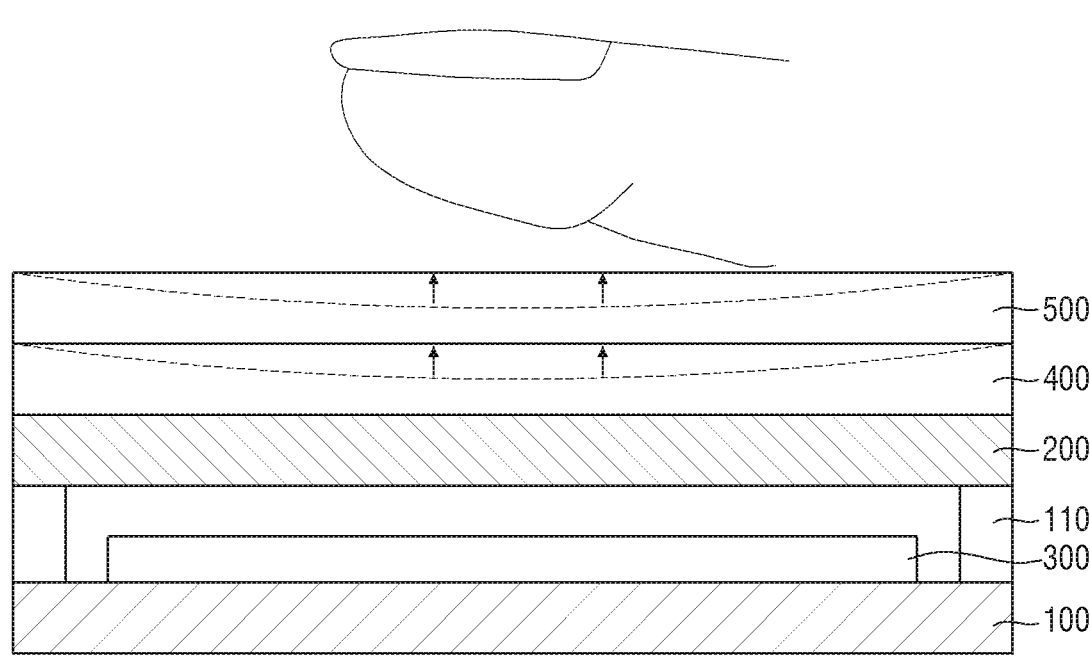
Figure 7:
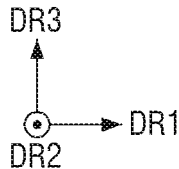

FIGS. 6 and 7 are cross-sectional views showing a change in the shape of a display device by an external pressure.

Referring to FIGS. 6 and 7, different pressures may be applied to the display device 10 in different usage environments, such as rubbing the display device 10 with a hand depending. It is assumed that an external pressure is applied to the surface of the display device 10 in the third direction DR3. When an external pressure is applied to the display device 10, the external pressure is applied directly to the surface of the polarizing member 500 located at the outermost position in the third direction DR3. The pressure applied to the surface of the polarizing member 500 is sequentially applied to the layers forming the polarizing member 500, and the pressure may be transmitted to the surface of the cushion layer 400 disposed on the opposite surface of the polarizing member 500.

When the pressure is applied to the surface of the cushion layer 400, a portion of the cushion layer 400 that receives the pressure may contract in the same direction as the pressure. The cushion layer 400 may apply a pressure to one surface of the second substrate 200 stacked on the opposite surface of the cushion layer 400, and the surface of the second substrate 200 may apply a pressure to the cushion layer 400 in the opposite direction to the external pressure as the reaction. As the cushion layer 400 contracts, an elastic force is generated in the direction opposite to the contraction direction. The contraction of the cushion layer 400 may proceed until the external pressure becomes equal to the sum of the elastic force and the pressure applied to the cushion layer 400 by the surface of the second substrate 200. When the pressure generated in daily life, such as rubbing the display device 10 by hand, acts as an external pressure, the elastic force due to the contraction of the cushion layer 400 is not significantly different from the external pressure. Therefore, the pressure applied to the cushion layer 400 by the surface of the second substrate 200 has a small value, and the pressure applied to the surface of the second substrate 200 by the cushion layer 400 as reaction may have such a small value that the second substrate 200 can withstand while maintaining its shape. As described above, by using the elastic force of the cushion layer 400, it is possible to reduce the influence of external pressure applied to the surface of the second substrate 200 and the elements thereunder. Accordingly, even when a pressure is applied from the outside of the display device 10, the shape of the display panel 11 including the second substrate 200 may be maintained.

When the external pressure is removed, the contracted cushion layer 400 still has the elastic force in the third direction DR3, and the cushion layer 400 may be restored to its original shape by the elastic force. While the external pressure applied to the surface of the polarizing member 500 is removed, the cushion layer 400 still applies upward pressure on the opposite surface of the polarizing member 500 by elastic force, and thus the polarizing member 500 can also restore to its original shape.

The cushion layer 400 and the polarizing member 500, which have become flat due to the elastic force of the cushion layer 400, no longer receive external pressure or elastic force except for gravity and normal force, so they can maintain their original flat shape. In this manner, the external and internal shapes of the display device 10 can be maintained before and after external pressure is applied, and thus the courses that light is incident from the outside of the display panel 11, is polarized, is reflected and is blocked can be maintained before and after external pressure is applied.

When the polarizing member 500 is disposed on the surface of the display device 10, external light diminishes in the course that the external light is incident and reflected, and the internal light may pass through the polarizing member 500 and can be recognized from the outside. Specifically, external light is incident on the display device 10 as the sum of randomly polarized lights, passes through the polarization layer 520 and is absorbed by the polarization layer 520, such that only the light vibrating in the same direction as the transmission axis of the polarization layer 520 may pass through the polarization layer 520. Light that has passed through the polarization layer 520 passes through the retardation layer 540 to be circularly polarized, and is reflected from the surface or the inside of the display panel 11, such that the phase is reversed. The reflected light passes through the retardation layer 540, is linearly polarized in the direction perpendicular to the transmission axis of the polarization layer 520, and is entirely absorbed in the linearly polarization layer and thus may not be recognized from the outside. On the other hand, internal light is still the sum of randomly polarized lights even after passing through the retardation layer 540, and the light passing through the polarization layer 520 and vibrating in the same direction as the transmission axis of the polarization layer 520 may pass through the polarization layer 520 and may be recognized from the outside.

When the display panel 11 is warped or pressed by an external pressure, the reflection distance of the incident light may be changed or the retardation value of the light may become different from the designed retardation value in the course that light is reflected in the display panel 11, and thus the external light may not be sufficiently absorbed by the polarizing member 500. In contrast, when the cushion layer 400 is disposed on the opposite surface of the polarizing member 500 as described above, the display panel 11 is not bent by virtue of the cushion layer 400 even after an external pressure is applied, so that the display device 10 can maintain the thickness and the curvature before and after the external pressure is applied. As a result, it is possible to prevent that the external light is reflected inside the display device 10 and recognized from the outside. In this manner, it is possible to improve the visibility of the display device 10 irrespective of the influence of external pressure and address the problem of light blur caused by external light.

Figure 8:
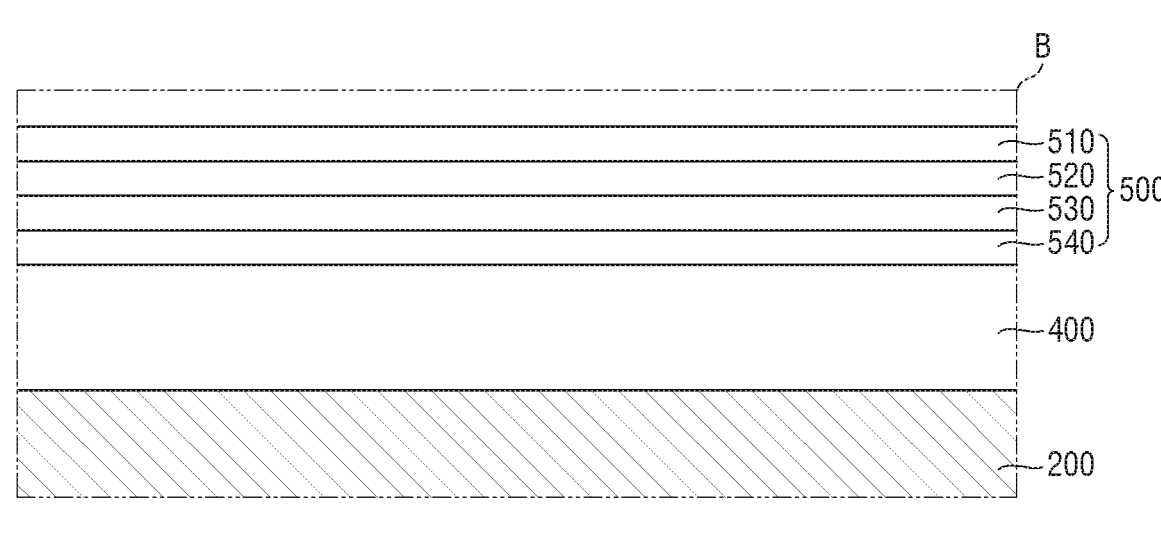
FIG. 8 is an enlarged view of a display device according to an embodiment of the present disclosure.
Figure 8:
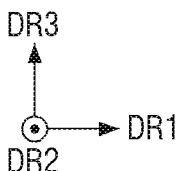

FIG. 8 is an enlarged view of a display device according to an embodiment of the present disclosure.

In FIG. 8, a polarizing member 500 may include no adhesive layer 550 of FIG. 5, and instead, the lower surface of the polarizing member 500 may be attached directly to one surface of a cushion layer 400. Specifically, as shown in FIG. 8, the polarizing member 500 according to an embodiment includes a retardation layer 540, a second protective layer 530, a polarization layer 520 and a first protective layer 510 sequentially stacked on one another. The retardation layer 540 forms the bottom layer of the polarizing member 500. The retardation layer 540 is disposed directly on one surface of the cushion layer 400. The cushion layer 400 includes or is a layer having an adhesive force such an optically clear adhesive (OCA), an optically transparent resin (OCR), and an acrylic adhesive, so that the retardation layer 540 can be directly fixed on the surface of the cushion layer 400. Therefore, even though the polarizing member 500 does not include the adhesive layer 550 of FIG. 5 at the bottom, the cushion layer 400 disposed on the opposite surface of the polarizing member 500 can attach the polarizing member 500 to the second substrate 200. In an embodiment, the polarizing member 500 may be formed of multiple layers stacked on each other. The retardation layer 540 may be the lowermost layer of the multiple layers of the polarizing member 500, and the first protective layer 510 may be the uppermost layer of the multiple layers of the polarizing member 500.

According to an embodiment, by disposing the cushion layer 400 directly on the bottom layer of the polarizing member 500 without the adhesive layer 550, the polarizing member 500 and the cushioning layer 400 can be formed integrally. As a result, the process of fabricating the polarizing member 500 including the cushion layer 400 can become simpler and the materials consumed can be saved.

Figure 9:
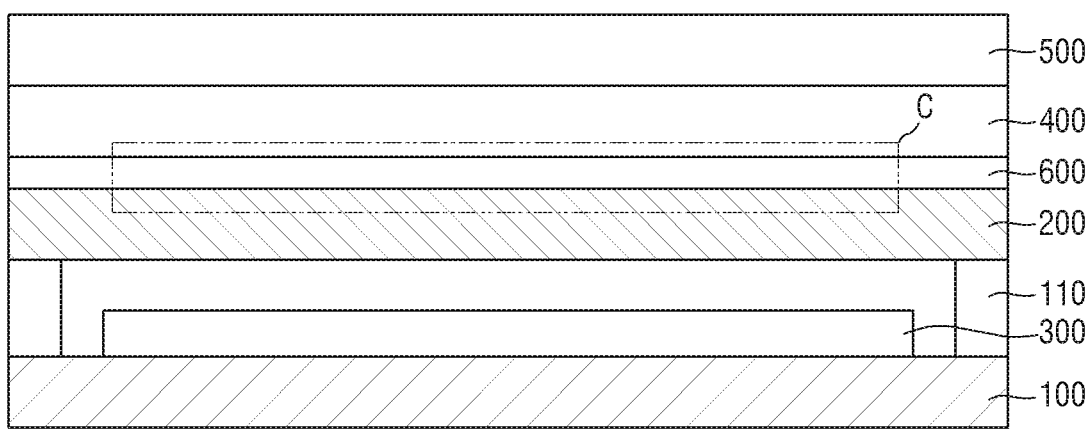
FIG. 9 is a cross-sectional view of a display device according to an embodiment of the present disclosure.
Figure 9:
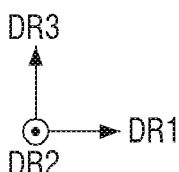

FIG. 9 is a cross-sectional view of a display device according to an embodiment of the present disclosure.

A display device 10 according to an embodiment is different from that of the embodiment of FIG. 3 in that a reflectance control layer 600 is further disposed between a display 300 and a polarizing member 500.

Specifically, the reflectance control layer 600 is disposed on one surface or the opposite surface of the second substrate 200, and a cushion layer 400 is disposed on one surface of the reflectance control layer 600. The reflectance control layer 600 may be disposed directly on the surface of the second substrate 200, and the cushion layer 400 may be disposed directly on one surface of the reflectance control layer 600, but the present disclosure is not limited thereto. For example, the reflectance control layer 600 may be disposed on the opposite surface of the second substrate 200, and a cushion layer may be disposed on one surface of the second substrate 200.

Figure 10:
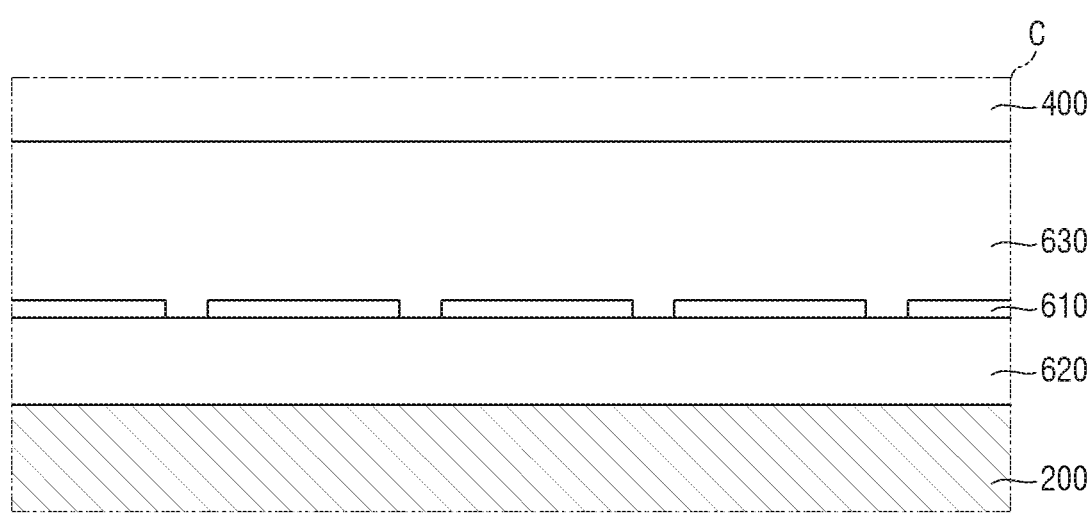
FIG. 10 is an enlarged view of area C of FIG. 9.
Figure 10:
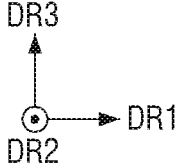

FIG. 10 is an enlarged view of area C of FIG. 9, and is a cross-sectional view showing the reflectance control layer, the second substrate and the cushion layer.

Referring to FIG. 10, the reflectance control layer 600 includes a plurality of transparent conductive oxide film patterns 610, and a first transparent auxiliary layer 620 and a second transparent auxiliary layer 630 surrounding the transparent conductive oxide film patterns 610 under and over them, respectively. Specifically, the first transparent auxiliary layer 620 is disposed on one surface of the second substrate 200, the transparent conductive oxide film patterns 610 are disposed on the first transparent auxiliary layer 620, and the second transparent auxiliary layer 630 is disposed thereon. The cushion layer 400 may be disposed on the surface of the second transparent auxiliary layer 630. The reflectance control layer 600 is in direct contact with the surface of the second substrate 200 and the opposite surface of the cushion layer 400 in the example shown in FIG. 10, but the present disclosure is not limited thereto. For example, a separate inorganic insulating film (or inorganic layer) may be disposed on the surface of the second substrate 200, the reflectance control layer 600 may be disposed thereon, another layer may be disposed on the surface of the reflectance control layer 600, and the cushion layer 400 may be disposed thereon. In addition, the reflectance control layer 600 may be disposed on the opposite surface of the second substrate 200 instead of on the one surface of the second substrate 200.

The plurality of transparent conductive oxide film patterns 610 may include or may be formed of ITO, IZO, or ZO. Each of the first transparent auxiliary layer 620 and the second transparent auxiliary layer 630 may be, but is not limited to, a silicon oxide film, a silicon nitride film, a silicon oxynitride film, etc. The first transparent auxiliary layer 620 and the second transparent auxiliary layer 630 may include or may be formed of, but is not limited to, the same material. According to an embodiment of the present disclosure, the transparent conductive oxide film patterns 610 may include or may be formed of ITO, and each of the first transparent auxiliary layer 620 and the second transparent auxiliary layer 630 may include or may be a silicon oxide film.

The transparent conductive oxide film patterns 610 work as the main reflectance control layer, while the first transparent auxiliary layer 620 and the second transparent auxiliary layer 630 assist in adjusting the reflectance by the transparent conductive oxide film patterns 610.

The thickness of the transparent conductive oxide film patterns 610 may range from 60 nm to 100 nm or may have a value between 60 nm and 100 nm. For example, the thickness of the transparent conductive oxide film patterns 610 may be 80 nm.

The thickness of the reflectance control layer 600 may be adjusted to approximately 10 times the thickness of the transparent conductive oxide film patterns 610. For example, the reflectance control layer 600 may have a thickness of 5 to 15 times the thickness of the transparent conductive oxide film patterns 610. For example, the thickness of the transparent conductive oxide film patterns 610 may range from 60 nm to 100 nm or may have a value between 60 nm and 100 nm, and the thickness of the reflectance control layer 600 may range from 600 nm to 1,000 nm or may have a value between 600 nm and 1,000 nm. According to an embodiment of the present disclosure, the transparent conductive oxide film pattern 610 and the reflectance control layer 600 may have thicknesses of approximately 80 nm and approximately 800 nm, respectively.

The thickness of the second transparent auxiliary layer 630 may be larger than that of the first transparent auxiliary layer 620 as shown in FIG. 10. It should be understood, however, that the present disclosure is not limited thereto. For example, the thickness of the second transparent auxiliary layer 630 may be equal to the thickness of the first transparent auxiliary layer 620, or rather the thickness of the second transparent auxiliary layer 630 may be greater than the thickness of the first transparent auxiliary layer 620.

Figure 11:
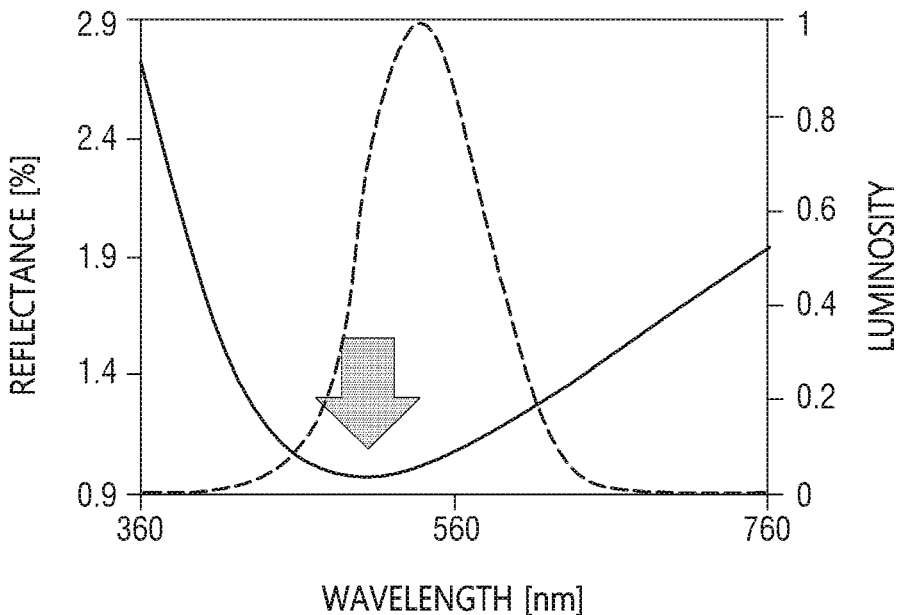
FIG. 11 is a graph showing relationships between wavelength of light, reflectance of a polarizing member and luminosity.
Figure 12:
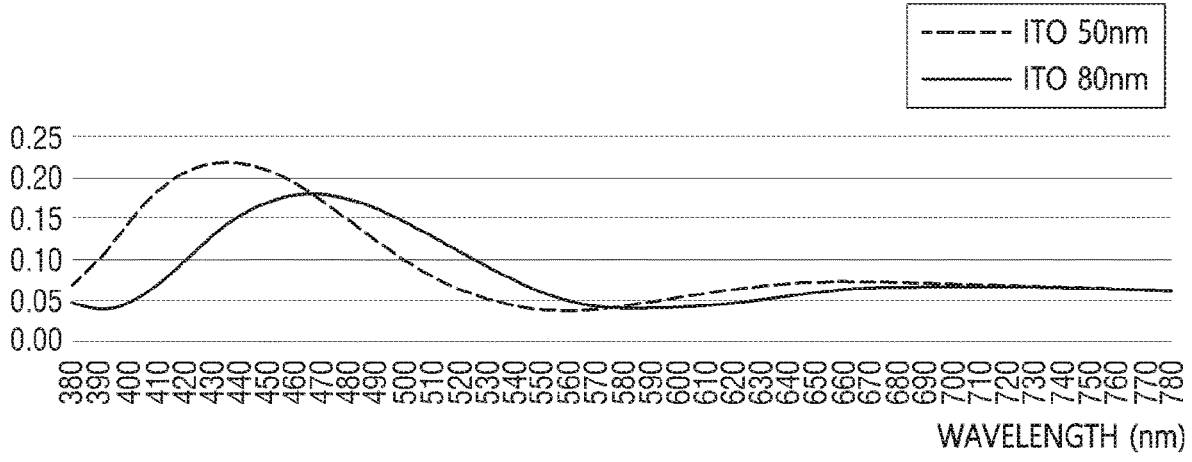
FIG. 12 shows graphs showing the relationships between the wavelength of light and the reflectance, and between the wavelength of light and the transmittance for different thicknesses of the transparent conductive oxide film patterns.
Figure 12:
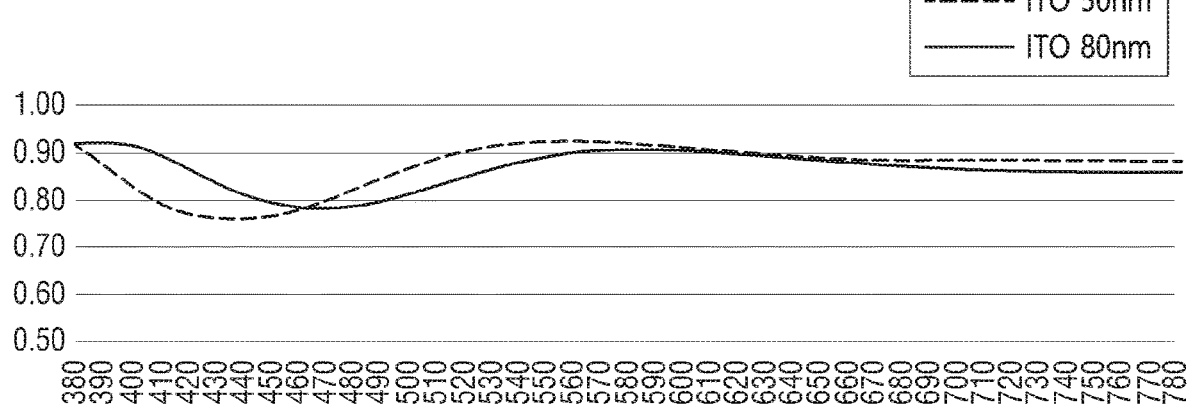

FIG. 11 is a graph showing relationships between wavelength of light, reflectance of a polarizing member and luminosity. FIG. 12 shows graphs showing the relationships between the wavelength of light and reflectance, and between the wavelength of light and the transmittance for different thicknesses of the transparent conductive oxide film patterns.

Referring to FIGS. 11 and 12, the polarizing member 500 may be subjected to low-reflection treatment without a hard coating layer on its surface. In this instance, the polarizing member 500 may have different reflectance depending on the wavelength of the incident light. For example, in a display device including the polarizing member that has been subjected to low-reflection treatment, the reflectance of the polarizing member 500 greatly increases when the wavelength of light is below 400 nm or above 600 nm, and the polarizing member 500 may have the minimum reflectance at the wavelength of light of 500 nm.

In contrast, referring to FIG. 12, the transparent conductive oxide film patterns 610 such as ITO has a low reflectance and a high transmittance when the wavelength of light is below 400 nm or above 600 nm, and has a high reflectance and a low transmittance when the wavelength of light is above 400 nm or below 600 nm. As can be seen from the graphs shown in FIG. 12, when the thickness of ITO is 50 nm, the maximum reflectance and the minimum transmittance are exhibited when the wavelength of incident light is 430 nm, while when the thickness of ITO is 80 nm, the maximum reflectance and the minimum transmittance are exhibited at the wavelength of 470 nm which is relatively close to 500 nm that is the wavelength of light exhibiting the lowest reflectance of the polarizing member 500. Accordingly, it is possible to more efficiently adjust the differences in the reflectance and the transmittance according to the wavelengths of the incident light when the thickness of the transparent conductive oxide film patterns 610 such as ITO in the reflectance control layer 600 is approximately 80 nm. Specifically, when the reflectance control layer 600 including the transparent conductive oxide film patterns 610 is disposed on the opposite surface of the polarizing member 500, incident light is reflected once off the surface of the polarizing member 500, and the light having passed through the polarizing member 500 may be reflected off the surfaces of the transparent conductive oxide film patterns 610. By disposing the reflectance control layer 600 including the transparent conductive oxide film patterns 610 with the thickness of 80 nm, the polarizing member 500 and the transparent conductive oxide film patterns 610 can complement each other in light of the reflectance and the transmittance, and the reflectance and transmittance according to the wavelength can be more efficiently adjusted, so that the difference in reflectance and transmittance according to the wavelength of the incident light can be reduced.

Figure 13:
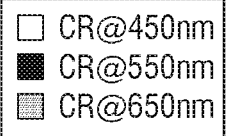
FIG. 13 is a graph showing the relationships between the thicknesses of the transparent conductive oxide film pattern and the transparent auxiliary layer, perception of Mura defects, and light transmittance.
Figure 13:
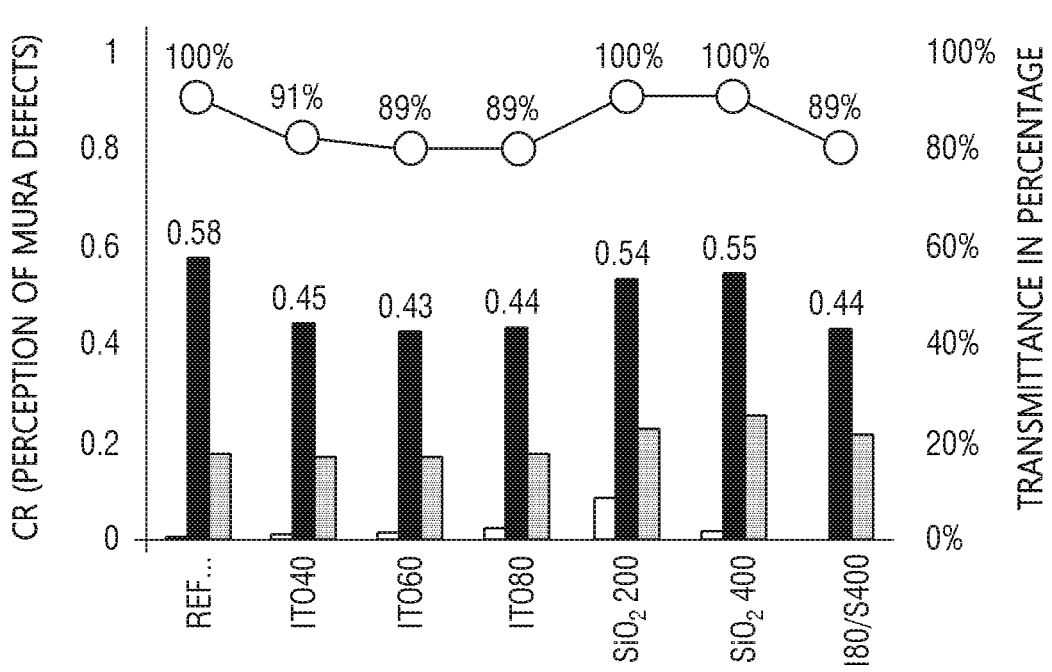

FIG. 13 is a graph showing the relationships between the thicknesses of the transparent conductive oxide film pattern and the transparent auxiliary layer, perception of Mura defects, and light transmittance.

As shown in FIG. 13, by disposing the reflectance control layer 600 in the display device 10, it is possible to reduce Mura defects due to external pressure. Specifically, the horizontal axis represents the components of the reflectance control layer and thickness of each of the components, and the vertical axis represents perception of Mura defects and transmittance. In addition, each of the bars in the graph represents the wavelength of external lights incident on the display device.

If the display panel 11 is warped by an external pressure, elliptically polarized light is generated while external light is reflected at the display panel 11, and thus the reflected light is not completely absorbed by the polarization layer 520 so that it may be recognized as Mura defects from the outside when the reflected light exits. The degree to which such Mura defects are recognized is defined as perception of Mura defects.

As can be seen from the graph, perception of Mura defects is the most severe when the wavelength of external light is 550 nm, perception of Mura defects is the smallest when the wavelength is 450 nm, and perception of Mura defects is approximately median when the wavelength is 650 nm. In an embodiment, the perception of Mura defects at the wavelength of 650 nm may be approximately half of the perception of Mura defects at the wavelength of 550 nm.

When the vertical axis value of each horizontal axis variable is compared with the reference, $SiO_2$ has insignificant influence on the transmittance and the perception of Mura defects. On the other hand, ITO reduces the transmittance and the perception of Mura defects. When there is only ITO with the thickness of 80 nm and when there are ITO with the thickness of 80 nm together with $SiO_2$ with the thickness of 400 nm, the perception of Mura defects was 0.44 and the transmittance was 89%, exhibiting the lowest perception of Mura defects and transmittance.

When the reflectance control layer 600 is added to the display device 10, the difference in reflectance according to the wavelength can be reduced, and the light passing through the polarizing member 500 may be reflected off the reflectance control layer 600 before it reaches the warped display panel 11. Accordingly, elliptically polarized light is not generated by the bent display panel 11, so that the perception of Mura defects may be reduced. When the thickness of the transparent conductive oxide film patterns 610 such as ITO is 80 nm, the perception of Mura defects may be reduced from 0.58 to 0.44. Accordingly, by disposing the reflectance control layer 600 on the surface of the second substrate 200 to reduce the perception of Mura defects, it is possible to suppress Mura from being recognized due to an external pressure.

Figure 14:
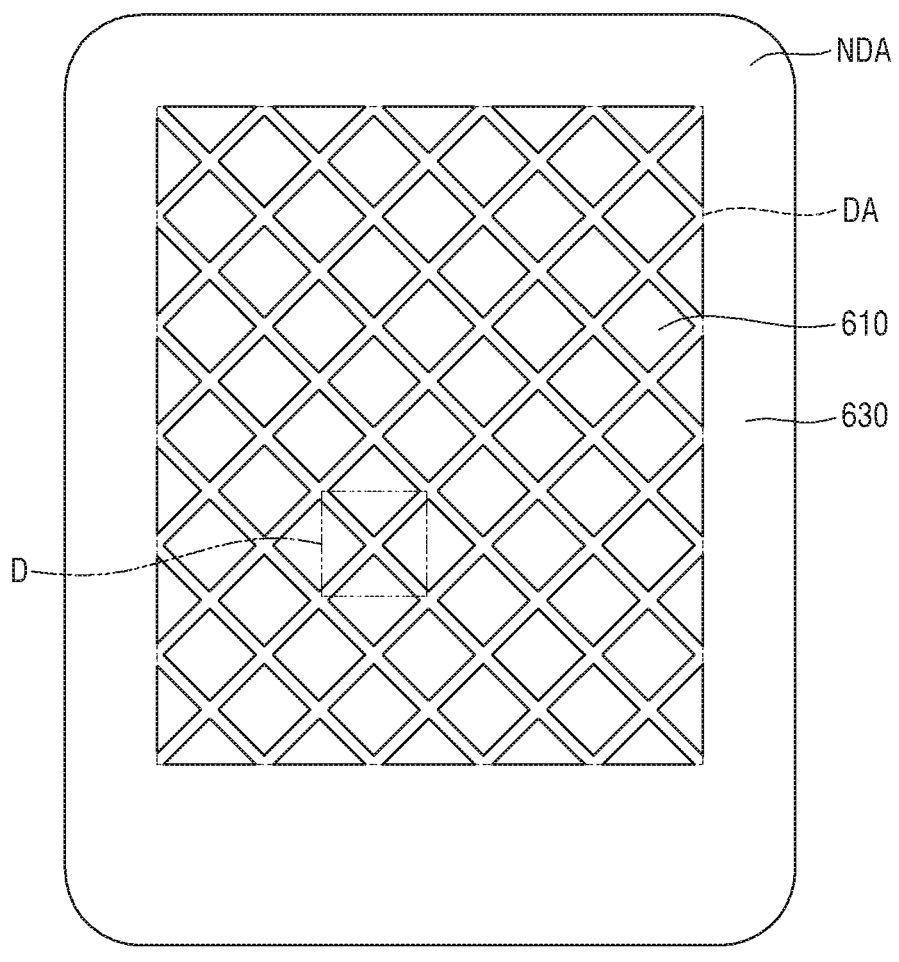
FIG. 14 is a plan view showing an arrangement of transparent conductive oxide film patterns of a reflectance control layer.
Figure 14:
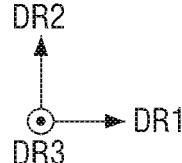
Figure 15:
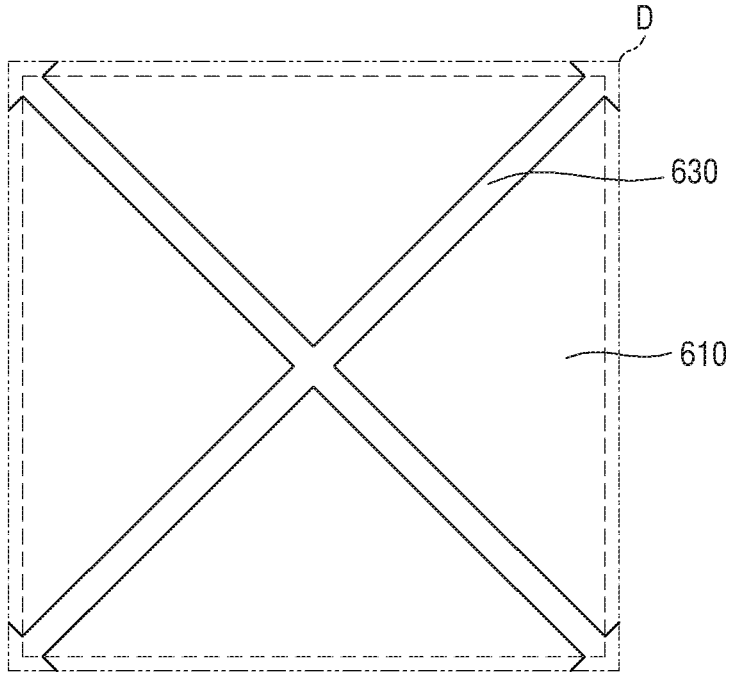
FIG. 15 is an enlarged view of area D of FIG. 14.
Figure 15:
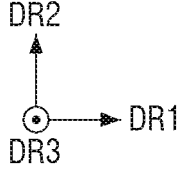

FIG. 14 is a plan view showing an arrangement of transparent conductive oxide film patterns of a reflectance control layer. FIG. 15 is an enlarged view of area D of FIG. 14.

Referring to FIGS. 14 and 15, the reflectance control layer 600 may include a plurality of transparent conductive oxide film patterns 610 in the display area DA in the reflectance control layer 600. Although the transparent conductive oxide film patterns 610 are disposed only in the display area DA but not in the non-display area NDA in the plan view, the present disclosure is not limited thereto. For example, the transparent conductive oxide film patterns 610 may be evenly disposed in the non-display area NDA as well as the display area DA.

The transparent conductive oxide film patterns 610 may be separated from one another and disposed independently. None of the drivers of the display device 10 may be connected to the transparent conductive oxide film patterns 610. The transparent conductive oxide film patterns 610 spaced apart from one another may be electrically floating and thus no voltage in the display device 10 may be directly applied thereto. In an embodiment, the transparent conductive oxide film patterns 610 may not be directly connected to a conductive line or pattern to which a voltage is applied in the display device 10. For example, the transparent conductive oxide film patterns 610 may be electrically isolated from a conductive line or pattern to which a voltage from a voltage source in the display device 10 is applied.

The size of the transparent conductive oxide film patterns 610 may be several tens to several thousand times the size of the pixels, but the present disclosure is not limited thereto. For example, the size of the transparent conductive oxide film patterns 610 may be less than or equal to ten times the size of the pixels, but even in this case, the size of the transparent conductive oxide film patterns 610 may be three times or greater than that of the pixels.

The transparent conductive oxide film patterns 610 have an island structure as a whole. The distance between the transparent conductive oxide film patterns 610 may have a value greater than or equal to a process margin that allows them to be separated stably. For example, the distance between the transparent conductive oxide film patterns 610 may be 5 nm or more. It should be noted that it is advantageous that the distance between the transparent conductive oxide film patterns 610 is small as long as they can be separated reliably because the area covered by the transparent conductive oxide film patterns 610 is increased.

FIGS. 14 and 15 show an example of the shape of transparent conductive oxide film patterns 610 when viewed from the top. As shown in FIGS. 14 and 15, the transparent conductive oxide film patterns 610 each having a diamond shape may be arranged in a matrix, so that they may have a substantially similar shape to that of ITO electrodes used for touch electrodes. However, the diamond shapes are different from the ITO electrodes used for the touch electrodes in that they are not connected with one another but are separated from one another. Although the transparent conductive oxide film patterns 610 in the diamond shape are arranged in a matrix in the example shown in FIGS. 14 and 15, the present disclosure is not limited thereto. For example, the transparent conductive oxide film patterns 610 may have different sizes and/or shapes, or may be spaced apart from one another by different distances.

Figure 16:
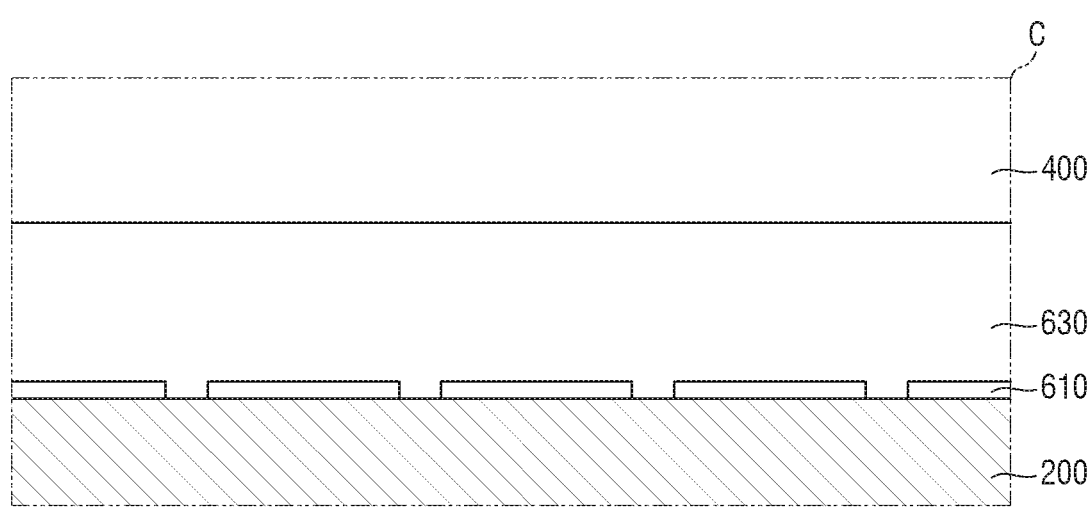
FIG. 16 is a cross-sectional view showing a reflectance control layer, a second substrate and a cushion layer according to an embodiment.
Figure 16:
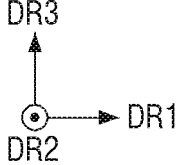

FIG. 16 is a cross-sectional view showing a reflectance control layer, a second substrate and a cushion layer according to an embodiment.

A display device 10 according to an embodiment is different from that of the embodiment of FIG. 10 in that transparent conductive oxide film patterns 610 are disposed directly on one surface of a second substrate 200.

Specifically, the transparent conductive oxide film patterns 610 are disposed at the bottom of a reflectance control layer 600, and accordingly the transparent conductive oxide film patterns 610 are disposed directly on one surface of the second substrate 200, and a second transparent auxiliary layer 630 is disposed over the transparent conductive oxide film patterns 610, and a cushion layer may be disposed on the second transparent auxiliary layer 630.

Since the first transparent auxiliary layer 620 has insignificant influence on the light transmittance and the perception of Mura defects as described above with reference to FIG. 13, it is possible to reduce differences in reflectance according to the wavelength and to suppress the perception of Mura defects, as described with reference to FIG. 10, even when the transparent conductive oxide film patterns 610 are disposed without the first transparent auxiliary layer 620 of FIG. 10.

By disposing the transparent conductive oxide film patterns 610 directly without the first transparent auxiliary layer 620 at the bottom layer of the reflectance control layer 600, the process of fabricating the reflectance control layer 600 can become simpler, and the fabrication process efficiency can be improved by saving the processing time.

Figure 17:
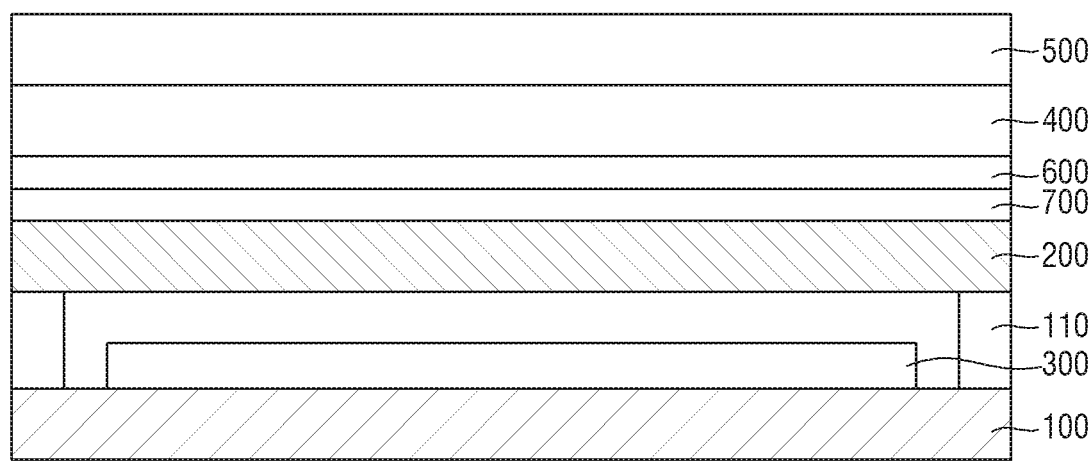
FIG. 17 is a cross-sectional view of a display device according to an embodiment of the present disclosure.
Figure 17:
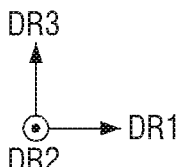

FIG. 17 is a cross-sectional view of a display device according to an embodiment of the present disclosure.

A display device 10 according to an embodiment is different from that of the embodiment of FIG. 9 in that a sensor electrode layer 700 is further disposed between the second substrate 200 and the reflectance control layer 600.

Specifically, a sensor electrode layer 700 is disposed on one surface of the second substrate 200, a reflectance control layer 600 is disposed on one surface of the sensor electrode layer 700, and a cushion layer 400 is disposed on one surface of the reflectance control layer 600. The sensor electrode layer 700 may be disposed directly on the surface of the second substrate 200, and the reflectance control layer 600 may be disposed directly on the surface of the sensor electrode layer 700, but the present disclosure is not limited thereto.

Figure 18:
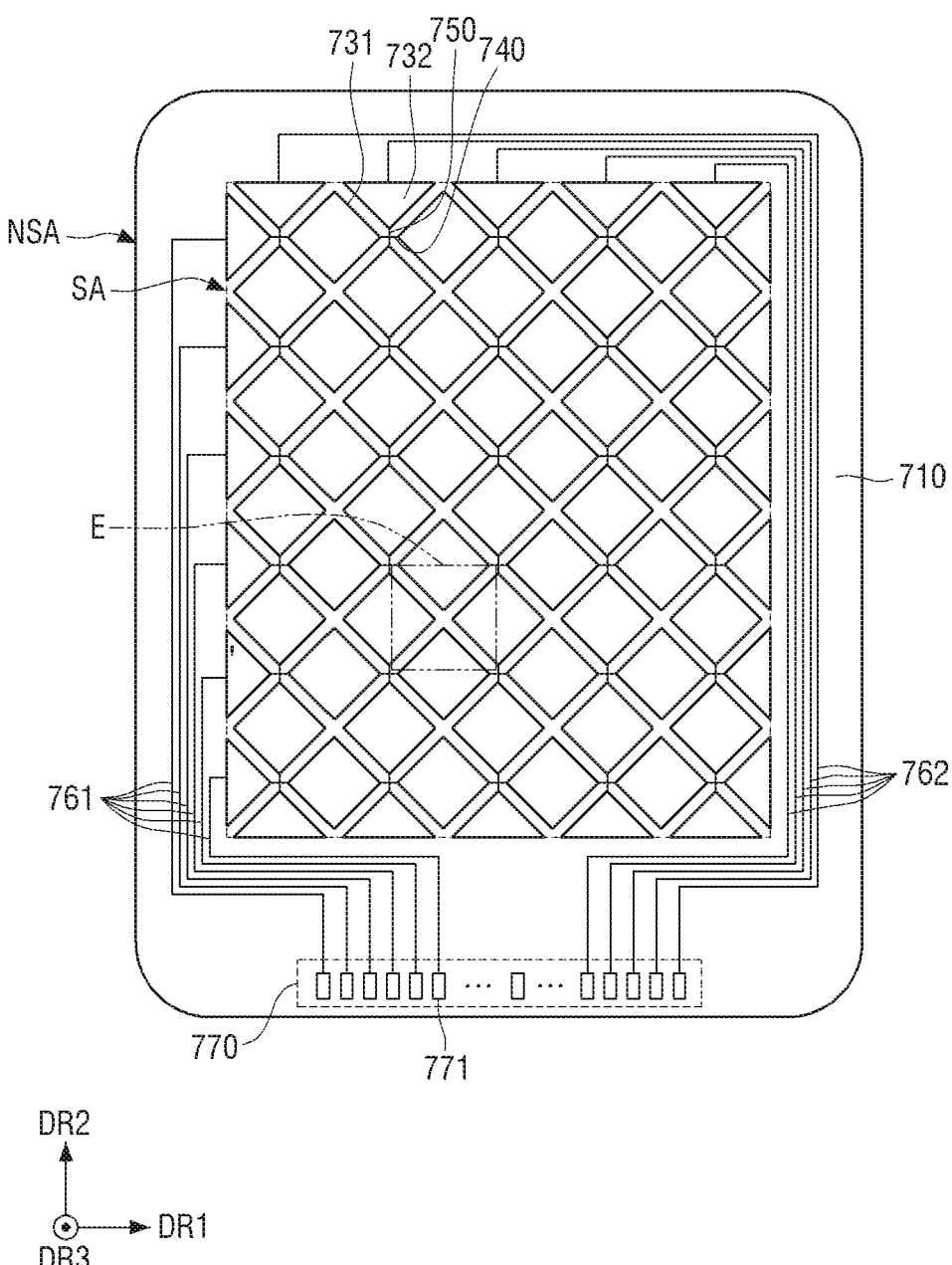
FIG. 18 is a schematic plan view of a sensor electrode layer.
Figure 19:
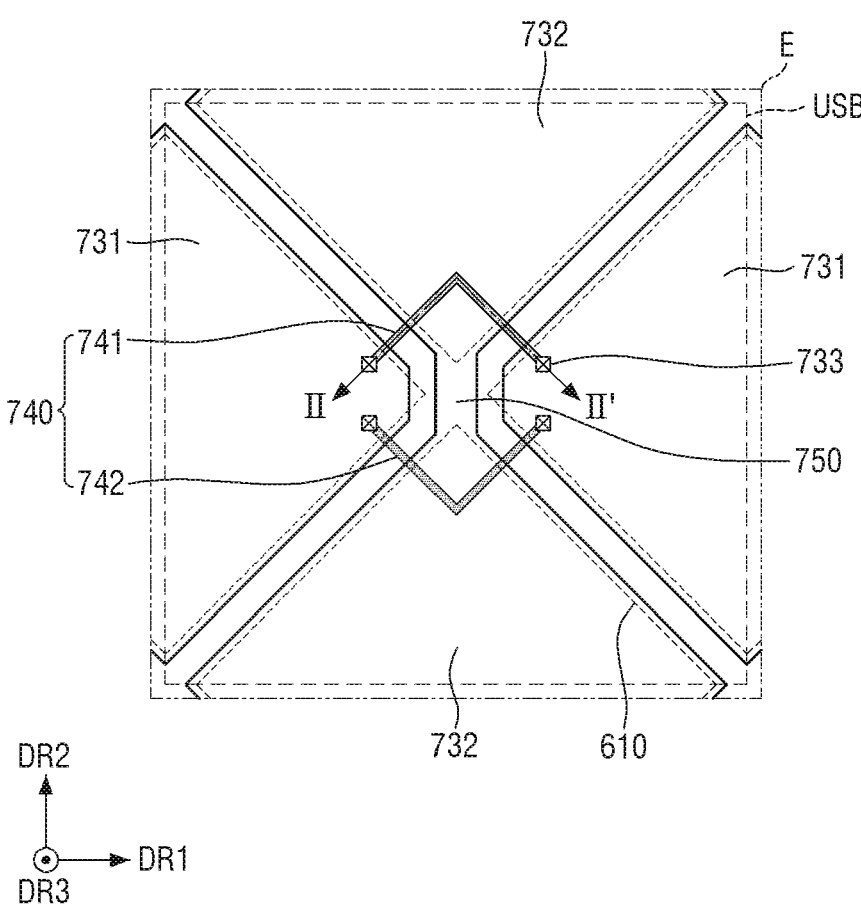
FIG. 19 is an enlarged view showing area E of FIG. 18 and the reflectance control layer.

FIG. 18 is a schematic plan view of a sensor electrode layer. FIG. 19 is an enlarged view showing area E of FIG. 18 and the reflectance control layer.

Referring to FIG. 18, the sensor electrode layer 700 may include a base layer 710 including a sensing area SA capable of sensing a touch input and a non-sensing area NSA surrounding at least a part of the sensing area SA.

The base layer 710 may be made of reinforced glass, transparent plastic, or a transparent film. In some implementations, the base layer 710 may be eliminated.

The sensing area SA may be located at the central area of the base layer 710 so that it overlaps the display area DA of the display panel 11. The sensing area SA may have a shape substantially identical to the shape of the display area DA, but the present disclosure is not limited thereto. The sensor electrodes for sensing a touch input are disposed in the sensing area SA.

The non-sensing area NSA may be located at the peripheral area of the base layer 710 so that it overlaps the non-display area NDA of the display panel 11. Sensing lines 760 electrically connected to the sensor electrodes to receive and transmit a sensing signal may be disposed in the non-sensing area NSA. In addition, a pad area 770 may be located in the non-sensing area NSA which is connected to the sensing lines 760 and electrically connected to the sensor electrodes of the sensing area SA. The pad area 770 may include a plurality of pads 771.

The sensor electrodes may include a plurality of sensor patterns 730 and first and second bridge patterns 750.

The sensor patterns 730 may include a plurality of first sensor patterns 731 and a plurality of second sensor patterns 732 electrically insulated from the first sensor patterns 731.

The first sensor patterns 731 may be arranged in the first direction DR1 and may be electrically connected to the adjacent first sensor patterns 731 by first bridge patterns 740 to form at least one sensor row. The second sensor patterns 732 may be arranged in the second direction DR2 intersecting the first direction DR1 and may be electrically connected to the adjacent second sensor patterns 732 by second bridge patterns 750 to form at least one sensor column.

The first sensor patterns 731 and the second sensor patterns 732 may be electrically connected to a single pad 771 through the respective sensing lines 760.

According to an embodiment of the present disclosure, the sensor electrode layer 700 may sense a change in mutual capacitance formed between the first sensor patterns 731 and the second sensor patterns 732 to recognize a user's touch.

The first bridge patterns 740 may serve to electrically connect between the first sensor patterns 731 arranged in parallel in the first direction DR1. Each of the first bridge patterns 740 may include a (1-1) bridge pattern 741 and a (1-2) bridge pattern 742.

The second bridge patterns 750 may electrically connect between the second sensor patterns 732 arranged in parallel along the second direction DR2, and the second bridge patterns 750 may also be extended along the direction DR2. According to an embodiment of the present disclosure, the second bridge patterns 750 may be formed integrally with the second sensor patterns 732. When the second bridge patterns 750 are formed integrally with the second sensor patterns 732, the second bridge patterns 750 may be portions of the second sensor patterns 732.

Referring to FIGS. 18 and 19, the sensor electrode layer 700 may be formed with unit sensor blocks USB repeatedly arranged as shown in FIG. 19. Each of the unit sensor blocks USB may be a virtual unit block that has a predetermined area and includes some of the sensor patterns 730 adjacent to each other in the first direction DR1 and some of the sensor patterns 730 adjacent to each other in the second direction DR2 within a given sensing area SA. Such a unit sensor block USB may be regarded as the minimum repeating unit of the arrangement of the sensor patterns 730 in a given sensing area SA.

Referring to FIG. 19, the sensor patterns 730 may overlap the transparent conductive oxide film patterns 610 of the reflectance control layer 600 disposed on the surface of the sensor electrode layer 700 in the third direction DR3. In FIG.

19, the edges of the transparent conductive oxide film patterns 610 indicated with dashed lines are slightly more to the inside than the edges of the first and second sensor patterns 731 and 732 indicated with solid lines in order to distinguish the transparent conductive oxide film patterns 610 from the sensor electrode layer 700. It should be understood, however, that these edges may substantially overlap each other when viewed from the top.

By aligning the first sensor patterns 731 and the second sensor patterns 732 of the sensor electrode layer 700 with the transparent conductive oxide film patterns 610 of the reflectance control layer 600 in the third direction DR3, it is possible to accurately recognize a user's touch even when the reflectance control layer 600 is disposed on the surface of the sensor electrode layer 700. That is to say, by adjusting the influence by the transparent conductive oxide film patterns 610 on the capacitance of the first sensor pattern 731 and the second sensor pattern 732 similarly, it is possible to adjust the reflectance according to the wavelength of the incident light without affecting the mechanism that senses the amount of change in the capacitance formed between the first and second sensor patterns 731 and 732. In addition, when the display device 10 is viewed from above, the arrangement of the transparent conductive oxide film patterns 610 coincides with the arrangement of the sensor electrode layer 700, so that it is possible to easily match the refractive indexes in the display device 10. It should be understood, however, that the present disclosure is not limited thereto. The transparent conductive oxide film patterns 610 may have different size, arrangement, and/or spacing from the sensor electrode layer 700.

Figure 20:
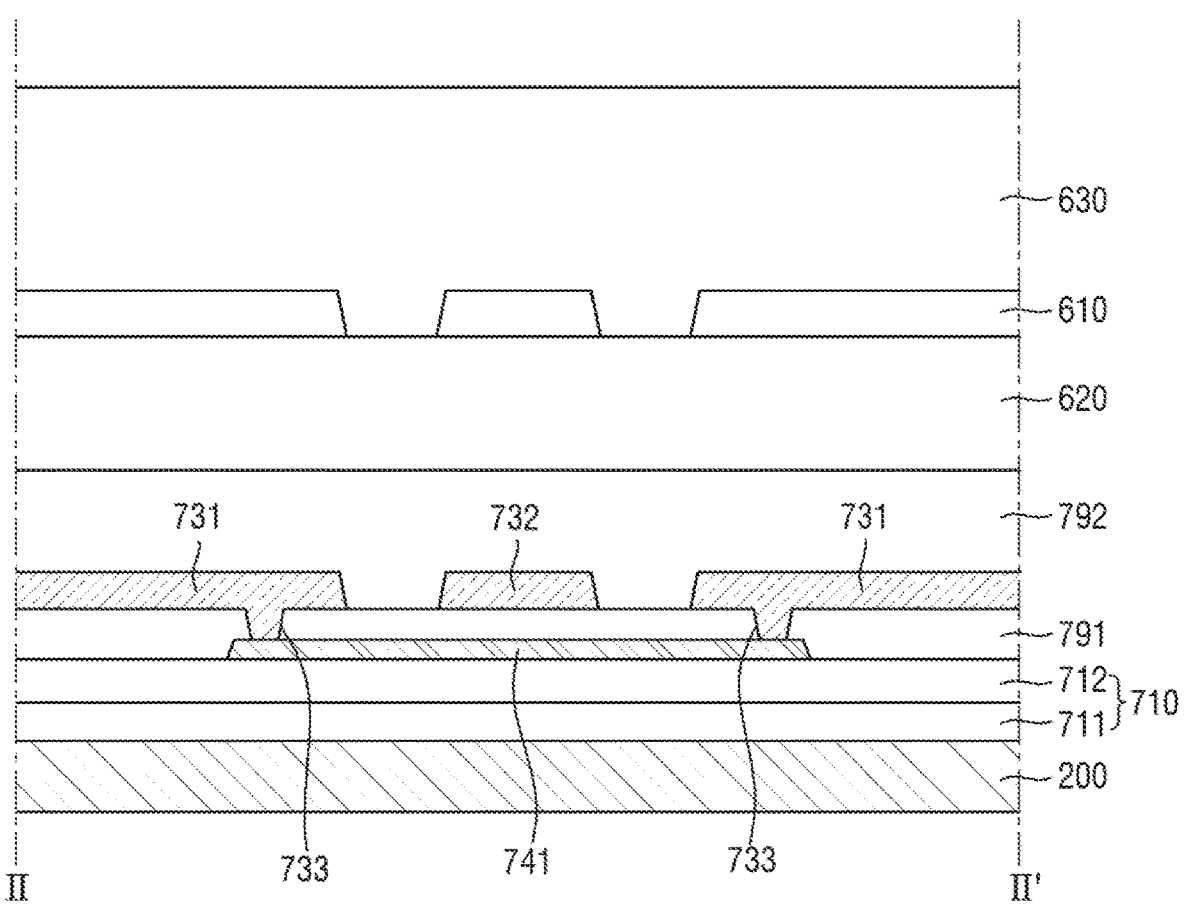
FIG. 20 is a cross-sectional view taken along line II-II' of FIG. 19.

FIG. 20 is a cross-sectional view taken along line II-II' of FIG. 19.

Referring to FIG. 20, a sensor electrode layer 700 may include a (1-1) bridge pattern 741 disposed on a base layer 710, a first insulating layer 791 disposed on the (1-1) bridge pattern 741, a first sensor pattern 731 and a second sensor pattern 732 disposed on the first insulating layer 791, and a second insulating layer 792 disposed on the first sensor pattern 731 and the second sensor pattern 732.

The base layer 710 may be disposed on a second substrate 200 of a display panel 11. The base layer 710 may include a first base layer 711 and a second base layer 712 sequentially stacked on one another.

The (1-1) bridge pattern 741 disposed on the second base layer 712 may include or may be formed of a low-resistance metal such as copper, gold, silver, platinum, nickel, and tin.

The first insulating layer 791 may be disposed on the (1-1) bridge pattern 741. The first insulating layer 791 may include or may be formed of, but is not limited to, the same material as the base layer 710.

The sensor patterns 730 may be disposed on the first insulating layer 791. The sensor patterns 730 may include or may be formed of a transparent conductive oxide such as ITO, IZO and ZO. The sensor patterns 730 may include or may be formed of the same material as the transparent conductive oxide film patterns 610 included in the reflectance control layer 600. According to an embodiment of the present disclosure, both the sensor patterns 730 and the transparent conductive oxide film patterns 610 may include or may be formed of ITO.

The first sensor patterns 731 adjacent to one another in the first direction DR1 may be electrically and/or physically connected with each other via contact holes 733 penetrating the first insulating layer 791 and first bridge patterns 740.

The second insulating layer 792 may be disposed over the first and second sensor patterns 731 and 732 disposed the first insulating layer 791. The second insulating layer 792 can prevent the (1-1) bridge pattern 741 from being exposed to the outside, thereby preventing corrosion of the (1-1) bridge pattern 741.

The reflectance control layer 600 may be disposed on the second insulating layer 792. Specifically, a first transparent auxiliary layer 620 may be disposed on the second insulating layer 792, transparent conductive oxide film patterns 610 may be disposed on the first transparent auxiliary layer 620, and a second transparent auxiliary layer 630 may be disposed on one surface of the transparent conductive oxide film patterns 610.

The transparent conductive oxide film patterns 610 are spaced apart from the second insulating layer 792, and may overlap the first sensor patterns 731 and the second sensor patterns 732 in the third direction DR3. In an embodiment, each of the transparent conductive oxide film patterns 610 may overlap a corresponding sensor pattern of the first and second sensor patterns 731 and 732 in the sensor electrode layer 700.

The sensor patterns 730 may mitigate differences in reflectance and transmittance according to the wavelength of incident light, together with the transparent conductive oxide film patterns 610. In an embodiment, the sensor patterns 730 may be in line with or may overlap the transparent conductive oxide film patterns 610. In an embodiment, the sensor patterns 730 and the transparent conductive oxide film patterns 610 are made of ITO, and the sum of the thicknesses of the sensor patterns 730 and the transparent conductive oxide film patterns 610 may be applied or may serve as the thickness of the ITO employed for the reflectance control described above with reference to FIG. 12. For example, the stacked structure of the sensor patterns 730 and the transparent conductive oxide film patterns 610 may serve as the ITO for the reflectance control as described with refence to FIG. 12. Accordingly, the sum of the thickness of the sensor patterns 730 and the thickness of the transparent conductive oxide film patterns 610 may range from 60 nm to 100 nm, for example, approximately 80 nm or may have a value between 60 nm and 100 nm, for example, approximately 80 nm.

As such, by disposing the sensor electrode layer 700 on the opposite surface of the reflectance control layer 600, it is possible to reduce the thickness of the transparent conductive oxide film patterns 610 compared to the structure in which the reflectance control layer 600 is disposed alone. Unlike the transparent conductive oxide film patterns 610, touch driving and sensing currents flow through the sensor electrode layer 700, and thus the sensor electrode layer 700 may be thicker than the transparent conductive oxide film patterns 610. It should be understood, however, that the present disclosure is not limited thereto. For example, the thickness of the sensor electrode layer 700 may be equal to or even less than the thickness of the transparent conductive oxide film patterns 610.

Features of various embodiments of the disclosure may be combined partially or totally. As will be clearly appreciated by those skilled in the art, technically various interactions and operations are possible. Various embodiments can be practiced individually or in combination.

In concluding the detailed description, those skilled in the art will appreciate that many variations and modifications can be made to the preferred embodiments without substantially departing from the principles of the invention. Therefore, the disclosed preferred embodiments of the invention are used in a generic and descriptive sense only and not for purposes of limitation.

What is claimed is:

1. An electronic device, comprising:
a display device comprising:
    a first substrate;
    a second substrate disposed to face the first substrate;
    a display comprising a light-emitting element, wherein the display is disposed between the first substrate and the second substrate;
    a polarizing member disposed above the second substrate; and
    a cushion layer disposed between the second substrate and the polarizing member,
wherein the cushion layer comprises an optically transparent adhesive or optically transparent resin,
wherein the polarizing member comprises an adhesive layer that is directly coupled to the cushion layer, and
wherein the cushion layer and the adhesive layer are made of different materials.

2. The electronic device of claim 1,
wherein the cushion layer has a thickness between 50 μm and 200 μm.

3. The electronic device of claim 1, further comprising:
a reflectance control layer disposed between the display and the cushion layer,
wherein the reflectance control layer comprises a plurality of transparent conductive oxide film patterns, and
wherein the plurality of transparent conductive oxide film patterns are separated from one another and are electrically floating.

4. The electronic device of claim 3,
wherein the cushion layer has an elastic modulus greater than an elastic modulus of the adhesive layer.

5. The electronic device of claim 1, wherein
the cushion layer and the polarizing member have a same width, and
the cushion layer is disposed between the polarizing member and each of the first substrate and the second substrate in a thickness direction of the display device.

6. The electronic device of claim 5, comprising
a display area and a non-display area,
wherein the cushion layer entirely covers the display area.

7. The electronic device of claim 1, wherein
the cushion layer has a modulus between 0.17 MPa and 0.25 MPa, and
the second substrate is disposed between the first substrate and the polarizing member in a thickness direction of the display device.

8. A display device comprising:
a first substrate;
a second substrate disposed to face the first substrate;
a display comprising a light-emitting element, wherein the display is disposed between the first substrate and the second substrate;
a polarizing member disposed above the second substrate; and
a cushion layer disposed between the second substrate and the polarizing member,
wherein the cushion layer is adhesive and comprises an optically transparent adhesive or optically transparent resin,
wherein the polarizing member is formed of multiple layers stacked on each other and includes a retardation layer as a lowermost layer of the multiple layers,
wherein the retardation layer is disposed directly on the cushion layer, and wherein the polarizing member is configured to have reflectance which changes depending on a wavelength of a light incident on the polarizing member.

9. The display device of claim 8, further comprising:
a reflectance control layer disposed between the display and the cushion layer,
wherein the reflectance control layer comprises a plurality of transparent conductive oxide film patterns, and
wherein the plurality of transparent conductive oxide film patterns are separated from one another and are electrically floating.

10. A display device comprising:
a first substrate;
a second substrate disposed to face the first substrate;
a display disposed between the first substrate and the second substrate;
a polarizing member disposed above the second substrate;
a reflectance control layer disposed between the display and the polarizing member; and
a cushion layer, wherein
the reflectance control layer comprises a plurality of transparent conductive oxide film patterns,
wherein the plurality of transparent conductive oxide film patterns are separated from one another and are electrically floating, and
the polarizing member includes an adhesive layer that is directly coupled to the cushion layer.

11. The display device of claim 10, wherein
the reflectance control layer is disposed between the polarizing member and the second substrate.

12. The display device of claim 11, further comprising:
a sensor electrode layer disposed between the second substrate and the reflectance control layer.

13. The display device of claim 12,
wherein the sensor electrode layer comprises a plurality of sensor patterns, and
wherein each of the plurality of sensor patterns overlaps a corresponding one of the plurality of transparent conductive oxide film patterns.

14. The display device of claim 13,
wherein a sum of a thickness of each of the plurality of sensor patterns and a thickness of a corresponding one of the plurality of transparent conductive oxide film patterns has a value between 60 nm and 100 nm.

15. The display device of claim 10,
wherein the plurality of transparent conductive oxide film patterns comprises ITO.

16. The display device of claim 15,
wherein a thickness of each of the plurality of transparent conductive oxide film patterns has a value between 60 nm and 100 nm.

17. The display device of claim 15,
wherein the reflectance control layer further comprises a transparent auxiliary layer disposed on the plurality of transparent conductive oxide film patterns.

18. The display device of claim 17,
wherein the transparent auxiliary layer comprises a silicon oxide film.

19. The display device of claim 10,
wherein each of the plurality of transparent conductive oxide film patterns has a diamond shape, and
wherein the plurality of transparent conductive oxide film patterns are arranged in a matrix.

20. The display device of claim 19, wherein a distance between two adjacent transparent conductive oxide films among the plurality of transparent conductive oxide film patterns is equal to or greater than 5 nm.

* * * * *